US012722271B2

(12) United States Patent
Abbott et al.

(10) Patent No.: US 12,722,271 B2
(45) **Date of Patent: *Sep. 1, 2026**

(54) MODE SELECTION OF A POWER TOOL

(71) Applicant: MILWAUKEE ELECTRIC TOOL CORPORATION, Brookfield, WI (US)

(72) Inventors: Jonathan E. Abbott, Milwaukee, WI (US); James N. Moran, Brookfield, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/801,000

(22) Filed: Aug. 12, 2024

(65) Prior Publication Data

US 2024/0399556 A1 Dec. 5, 2024

Related U.S. Application Data

(63) Continuation of application No. 17/056,589, filed as application No. PCT/US2020/046345 on Aug. 14, 2020, now Pat. No. 12,059,792.

(Continued)

(51) Int. Cl.
*B25F 5/02* (2006.01)
*H02P 23/24* (2016.01)

(52) U.S. Cl.
CPC ................ *B25F 5/02* (2013.01); *H02P 23/24* (2016.02)

(58) Field of Classification Search
CPC .................................. B25F 5/02; H02P 23/24
See application file for complete search history.

(56) References Cited

U.S. PATENT DOCUMENTS 3,376,402 A * 4/1968 Bednarski .............. H01H 9/063 200/1 V
3,467,801 A * 9/1969 Matthews .............. H01H 9/063 200/16 R (Continued)

FOREIGN PATENT DOCUMENTS

CN 107635726 A 1/2018
DE 3316111 A1 11/1983

(Continued)

OTHER PUBLICATIONS

International Search Report and Written Opinion for Application No. PCT/US2020/046345 dated Nov. 25, 2020 (10 pages).

(Continued)

*Primary Examiner* — Lucas E. A. Palmer
(74) *Attorney, Agent, or Firm* — Michael Best & Friedrich LLP

(57) ABSTRACT

Devices and methods described herein provide for controlling an operating mode of a power tool. Controlling the power tool includes operating, by a motor controller, a motor of the power tool in a first operating mode. Controlling the power tool also includes detecting, by the motor controller, a position of a forward-reverse selector of the power tool, and receiving, by the motor controller, a signal from a mode selector. Controlling the power tool also includes determining, by the motor controller, whether the position of the forward-reverse selector is in the mode selection position, and in response to determining that the forward-reverse selector is in the mode selection position, changing, by the motor controller, the power tool to a second operating mode based on the signal received from the mode selector.

20 Claims, 15 Drawing Sheets

Related U.S. Application Data

(60) Provisional application No. 63/037,773, filed on Jun. 11, 2020, provisional application No. 62/887,937, filed on Aug. 16, 2019.

(56) References Cited

U.S. PATENT DOCUMENTS

| | | | | | |
|---|---|---|---|---|---|
| 3,632,936 | A * | 1/1972 | Piber | H01H 9/063 | 200/293.1 |
| 3,662,241 | A * | 5/1972 | Sweger | G05D 23/2754 | 318/473 |
| 3,755,640 | A * | 8/1973 | Kaman | H01H 9/063 | 200/522 |
| 3,882,294 | A * | 5/1975 | Hults | H01H 9/063 | 200/332.2 |
| 4,342,931 | A * | 8/1982 | Grossmann | H02K 23/18 | 173/48 |
| 6,192,996 | B1 * | 2/2001 | Sakaguchi | B25D 16/006 | 173/48 |
| 6,536,536 | B1 * | 3/2003 | Gass | B25F 5/021 | 173/171 |
| 6,868,919 | B1 * | 3/2005 | Manschitz | B25D 16/006 | 335/205 |
| 7,086,483 | B2 | 8/2006 | Arimura et al. | | |
| 7,112,751 | B2 * | 9/2006 | Turley | H01H 9/063 | 200/332.2 |
| 7,124,839 | B2 * | 10/2006 | Furuta | B25B 21/00 | 173/104 |
| 7,395,875 | B2 * | 7/2008 | Krondorfer | B25F 5/001 | 320/135 |
| 8,387,719 | B2 * | 3/2013 | Scrimshaw | B25F 5/001 | 173/180 |
| 9,457,462 | B2 * | 10/2016 | Mergener | B25F 5/001 | |
| 10,025,733 | B2 * | 7/2018 | Zhu | G06F 5/015 | |
| 2004/0174699 | A1 * | 9/2004 | Minalga | B25B 23/18 | 362/119 |
| 2005/0045354 | A1 * | 3/2005 | Arimura | B25B 23/14 | 173/219 |
| 2011/0180286 | A1 * | 7/2011 | Oomori | H02K 9/06 | 173/217 |
| 2013/0021783 | A1 * | 1/2013 | Vanko | B25B 21/00 | 362/119 |
| 2013/0105187 | A1 * | 5/2013 | Agehara | B25B 21/00 | 362/119 |
| 2013/0180745 | A1 | 7/2013 | Scrimshaw et al. | | |
| 2013/0278181 | A1 * | 10/2013 | Palma | H02P 6/22 | 318/287 |
| 2014/0216774 | A1 | 8/2014 | Scrimshaw et al. | | |
| 2014/0284070 | A1 * | 9/2014 | Ng | B25F 5/00 | 173/2 |
| 2016/0107297 | A1 * | 4/2016 | Ishikawa | B25B 23/18 | 173/179 |
| 2016/0173015 | A1 * | 6/2016 | Sawano | H02P 6/22 | 318/446 |
| 2016/0204718 | A1 * | 7/2016 | Koizumi | B25F 5/00 | 318/400.18 |
| 2016/0221085 | A1 * | 8/2016 | Zhong | B23B 31/10 | |
| 2016/0342151 | A1 * | 11/2016 | Dey, IV | G06F 3/04847 | |
| 2017/0083014 | A1 * | 3/2017 | Conrad | G05B 19/425 | |
| 2017/0127501 | A1 * | 5/2017 | Isaacs | H05B 47/115 | |
| 2017/0173768 | A1 * | 6/2017 | Dey, IV | B25B 21/02 | |
| 2018/0185993 | A1 * | 7/2018 | Hita | B25B 21/00 | |
| 2018/0222022 | A1 * | 8/2018 | Kumagai | B25D 11/104 | |
| 2019/0001457 | A1 * | 1/2019 | Ely | B25F 5/00 | |
| 2019/0111551 | A1 * | 4/2019 | Kato | B25B 21/02 | |
| 2020/0133229 | A1 * | 4/2020 | Girt | B25F 5/00 | |
| 2020/0376645 | A1 * | 12/2020 | Davis | H04M 1/72412 | |
| 2020/0398416 | A1 * | 12/2020 | Matei | B25F 5/02 | |
| 2021/0205976 | A1 * | 7/2021 | Matei | G08B 7/06 | |

FOREIGN PATENT DOCUMENTS

| | | | |
|---|---|---|---|
| DE | 4128651 | A1 | 3/1993 |
| DE | 10337260 | A1 | 3/2005 |
| EP | 3222389 | A1 | 9/2017 |
| JP | 2009248290 | A1 | 10/2009 |
| KR | 101515883 | B1 | 5/2015 |
| KR | 1020180026492 | A | 3/2018 |
| WO | 2019150651 | A1 | 8/2019 |

OTHER PUBLICATIONS

Extended European Search Report for Application No. 20853983.3 dated Jun. 27, 2023 (8 pages).

Chinese Patent Office Action for Application No. 202080057997.8 dated Jul. 22, 2023 (25 pages inluding machine English translation).

Chinese Patent Office Action for Application No. 202080057997.8 dated Mar. 28, 2024 (23 pages includig machine English translation).

* cited by examiner

Receive Input Signal From FR Selector

662

Input Received Corresponding to FF or RR positions?

664

No

Maintain Tool in Current Operating Mode

666

Yes

Combination of Inputs Correspond to a Mode, Setting or Operational Change?

668

No

Yes

Change Mode of Tool Based on Received Input Signal

670

MODE SELECTION OF A POWER TOOL

RELATED APPLICATIONS

This application is a continuation of, and claims the benefit of, and priority to, U.S. patent application Ser. No. 17/056,589, filed Nov. 18, 2020, which claims the benefit of, and priority to, U.S. Provisional Patent Application No. 62/887,937, filed Aug. 16, 2019, and U.S. Provisional Patent Application No. 63/037,773, filed Jun. 11, 2020, the entire contents of each are hereby incorporated by reference.

FIELD

Embodiments described herein relate to systems and methods for modifying modes of an electric power tool using one handed operation.

SUMMARY

Power tools may have multiple operating modes that a user can select from when operating the tool. However, during operation of the tool, a user may not desire to manipulate the tool, or their hands on the tool, in order to switch or modify operating modes. Thus, it is desirable for a power tool to allow a user to switch modes without unnecessarily manipulating the tool away from the operating position.

Methods described herein provide for controlling an operating mode of a power tool. The methods include operating, by a motor controller, a motor of the power tool in a first operating mode, receiving, by the motor controller, a first input associated with a position of a forward-reverse selector of the power tool, receiving, by the motor controller, a second input associated with the position of a forward-reverse selector of the power tool, determining, by the motor controller, whether the detection of the first input and the second input occurred within a predetermined time period, determining, based on the receipt of the first input and the second input occurring within the predetermined time period, whether the combination of the first input and the second input corresponds to a request to modify a parameter of the power tool, and modifying the parameter of the power tool in response to determining the combination of the first input and the second input corresponds to a request to modify the parameter of the power tool.

In some embodiments, the first input and the second input are associated with the forward-reverse selector transitioning from a first position to a second position.

In some embodiments, the second position is a return biased position configured to cause the forward-reverse selector to return to the first position when a force is removed from the forward-reverse selector.

In some embodiments, the first input is associated with the forward-reverse selector transitioning from a first position to a second position, and the second input is associated with the forward-reverse selector transitioning from the second position to the first position.

In some embodiments, the methods also include receiving, by the motor controller, a third input associated with the position of the forward-reverse selector of the power tool, determining, by the motor controller, whether the receipt of the first input, the second input, and the third input occurred within the predetermined time period, determining, based on the detection of the first input, the second input, and the third input occurring within the predetermined time period, whether the combination of the first input, the second input, and the third input corresponds to a request to modify the parameter of the power tool, and modifying the parameter of the power tool in response to determining the combination of the first input, the second input, and the third input corresponds to a request to modify the parameter of the power tool.

In some embodiments, the predetermined time period is one second.

Power tools described herein include a forward-reverse selector, a motor, a mode selection input, and a motor controller. The motor controller includes an electronic processor and a memory. The motor controller is coupled to the forward-reverse selector and the mode selection input. The motor controller is configured to operate the motor in a first operating mode, detect a position of the forward-reverse selector of the power tool, determine whether the position of the forward-reverse selector is in a mode selection position, receive a signal from the mode selection input, and configure the power tool to operate in a second operating mode based on the signal received from the mode selection input in response to determining the position of the forward-reverse selector is in the mode selection position.

In some embodiments, the mode selection input is a trigger of the power tool.

In some embodiments, the motor controller is also configured to determine, while the power tool is in the second operating mode, whether the forward-reverse selector is in a forward mode position or a reverse mode position. The motor controller is further configured to receive an actuation signal from the trigger while the forward-reverse selector is in one of the forward mode position and the reverse mode position, and operate the power tool in the second operating mode in response to the received actuation signal and the determined position of the forward-reverse selector.

In some embodiments, the mode selection input and a trigger of the power tool are separate actuators.

In some embodiments, the forward-reverse selector is selectable between a forward position, a neutral position, and a reverse position.

In some embodiments, the neutral position is the mode selection position.

In some embodiments, the forward-reverse selector is selectable between a forward position, a mode selection position, a neutral position, and a reverse position.

In some embodiments, the motor controller is further configured to receive a first signal from the mode selection input in response to a first actuation of the mode selection input, receive a second signal from the mode selection input in response to a second actuation of the mode selection input, and configure the power tool to operate in the second operating mode in response to receiving the first signal and the second signal.

In some embodiments, the power tool is configured to operate in the second operating mode in response to determining that the first signal and the second signal were received within a predetermined amount of time.

In some embodiments the signal from the mode selection input is one of a number of signals from the mode selection input, each generated by respective actuations of the mode selection input, and wherein the changing, by the motor controller of the power tool to the second operating mode is based on the number of signals received form the mode selection input.

In some embodiments, the first operational mode and the second operational mode are selected from a group of modes, the group of modes including a self-tapping screw mode, a deck screw mode, and a drywall screw mode.

Power tools described herein include a forward-reverse selector, a motor, a microphone, and a motor controller. The motor controller includes an electronic processor and a memory. The motor controller is coupled to the forward-reverse selector, the mode selection input, and the microphone. The motor controller is configured to operate the motor in a first operating mode, detect a position of the forward-reverse selector of the power tool, determine whether the position of the forward-reverse selector is in a mode selection position, monitor for a voice command input via the microphone based on the forward-reverse selector being determined to be in the mode selection position, determine that the voice command input includes one selected from the group of instructions to modify a mode and/or setting of the power tool and execute one or more operations of the power tool, and modify the mode of the power tool based on determining that the voice command input comprises an instruction to modify the mode of the power tool.

In some embodiments, the motor controller is further configured to execute an operation of the power tool based on determining that the voice command input includes an instruction to execute the one or more operations of the power tool.

In some embodiments, the one or more operations include at least one of a fastener mode, a speed mode, and a torque mode.

Methods described herein provide for controlling an operating mode of a power tool. The methods include operating, by a motor controller, a motor of the power tool in a first operating mode. The method also includes detecting, by the motor controller, a position of a forward-reverse selector of the power tool, and receiving, by the motor controller, a signal from a mode selector. The method further includes determining, by the motor controller, whether the position of the forward-reverse selector is in the mode selection position, and in response to determining that the forward-reverse selector is in the mode selection position, changing, by the motor controller, the power tool to a second operating mode based on the signal received from the mode selector.

In some embodiments, the mode selector is a trigger of the power tool, and the method further includes, while the power tool is in the second operating mode, determining, by the motor controller, whether the position of the forward-reverse selector is in a forward mode position or a reverse mode position, determining, by the motor controller, that the trigger of the power tool is actuated while the forward-reverse selector is in the forward mode position or the reverse mode position, and operating, by the motor controller, the motor of the power tool in the second operating mode in response to determining that the trigger is actuated while the forward-reverse selector is in the forward mode position or the reverse mode position.

In some embodiments, the forward-reverse selector is selectable between a forward position, a neutral position, and a reverse position.

In some embodiment, the neutral position is the mode selection position.

In some embodiments, the forward-reverse selector is selectable between a forward position, a mode selection position, a neutral position, and a reverse position.

In some embodiments, the signal from the mode selector is a first signal, and the method also includes receiving, by the motor controller, a second signal from the mode selector, wherein the first signal and the second signal are generated by the mode selector in response to respective first and second actuations of the mode selector, and wherein the changing, by the motor controller, of the power tool to the second operating mode is also based on the second signal received from the mode selector.

In some embodiments, the signal from the mode selector is one of a number of signals from the mode selector, each generated by respective actuations of the mode selector, and wherein the changing, by the motor controller, of the power tool to the second operating mode is based on the number of signals received from the mode selector.

In some embodiments, the first operational mode and the second operational mode are selected from a group of modes, the group of modes comprising a self-tapping screw mode, a deck screw mode, and a drywall screw mode.

In some embodiments, wherein the changing, by the motor controller, of the power tool to the second operating mode is also based on determining that the first signal and the second signal were received from the mode selector within a predetermined amount of time.

Before any embodiments are explained in detail, it is to be understood that the embodiments are not limited in their application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of “including,” “comprising” or “having” and variations thereof herein is meant to encompass the items listed thereafter and equivalents thereof as well as additional items. The terms “mounted,” “connected” and “coupled” are used broadly and encompass both direct and indirect mounting, connecting and coupling. Further, “connected” and “coupled” are not restricted to physical or mechanical connections or couplings, and can include electrical connections or couplings, whether direct or indirect.

It should be noted that a plurality of hardware and software based devices, as well as a plurality of different structural components may be utilized to implement the disclosed embodiments. Furthermore, and as described in subsequent paragraphs, the specific configurations illustrated in the drawings are intended to exemplify embodiments and that other alternative configurations are possible. The terms “processor” “central processing unit” and “CPU” are interchangeable unless otherwise stated. Where the terms “processor” or “central processing unit” or “CPU” are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

DETAILED DESCRIPTION

Figure 1A:
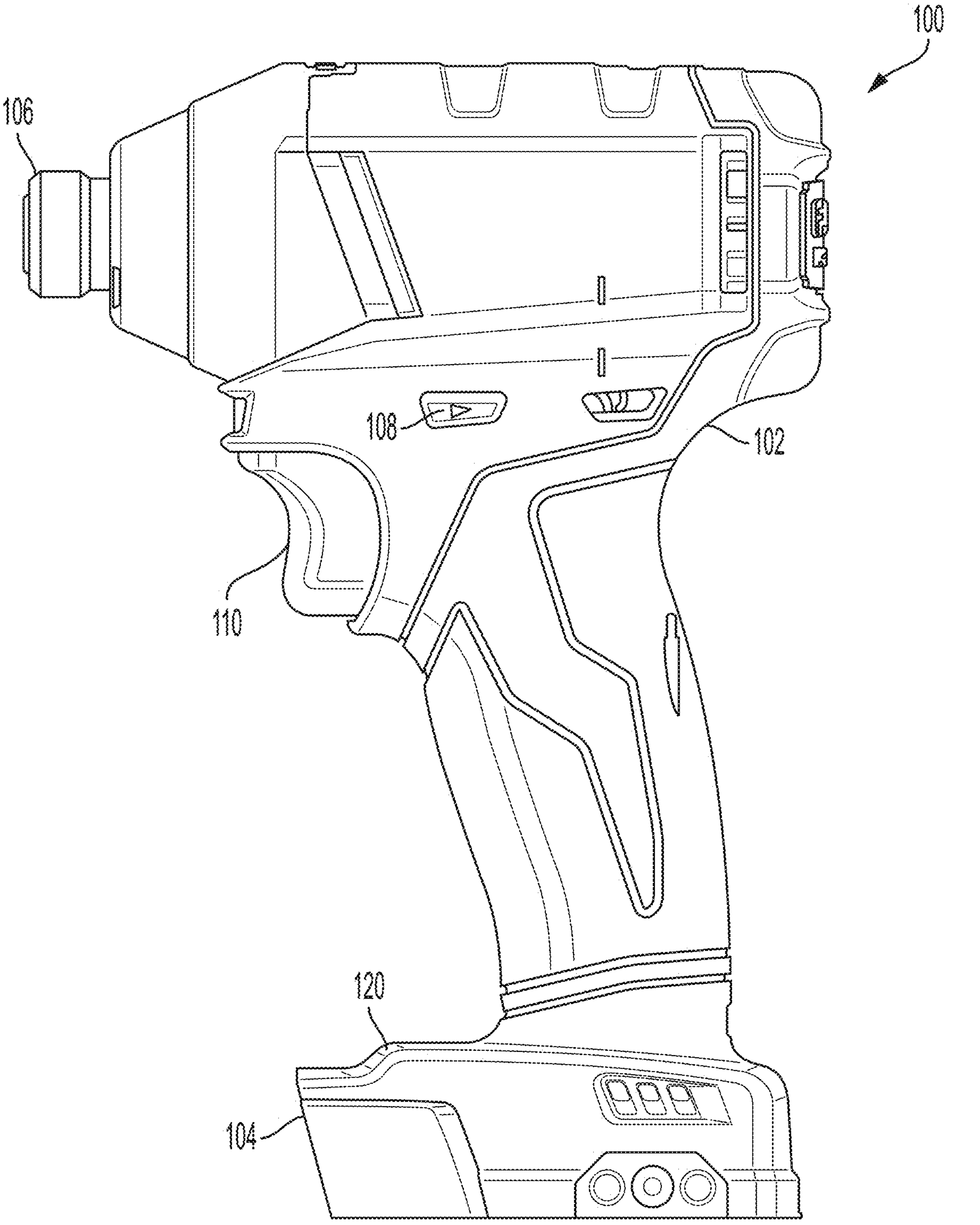
FIGS. 1A-1B are views of a power tool having a forward-reverse shuttle, according to some embodiments.
Figure 1B:
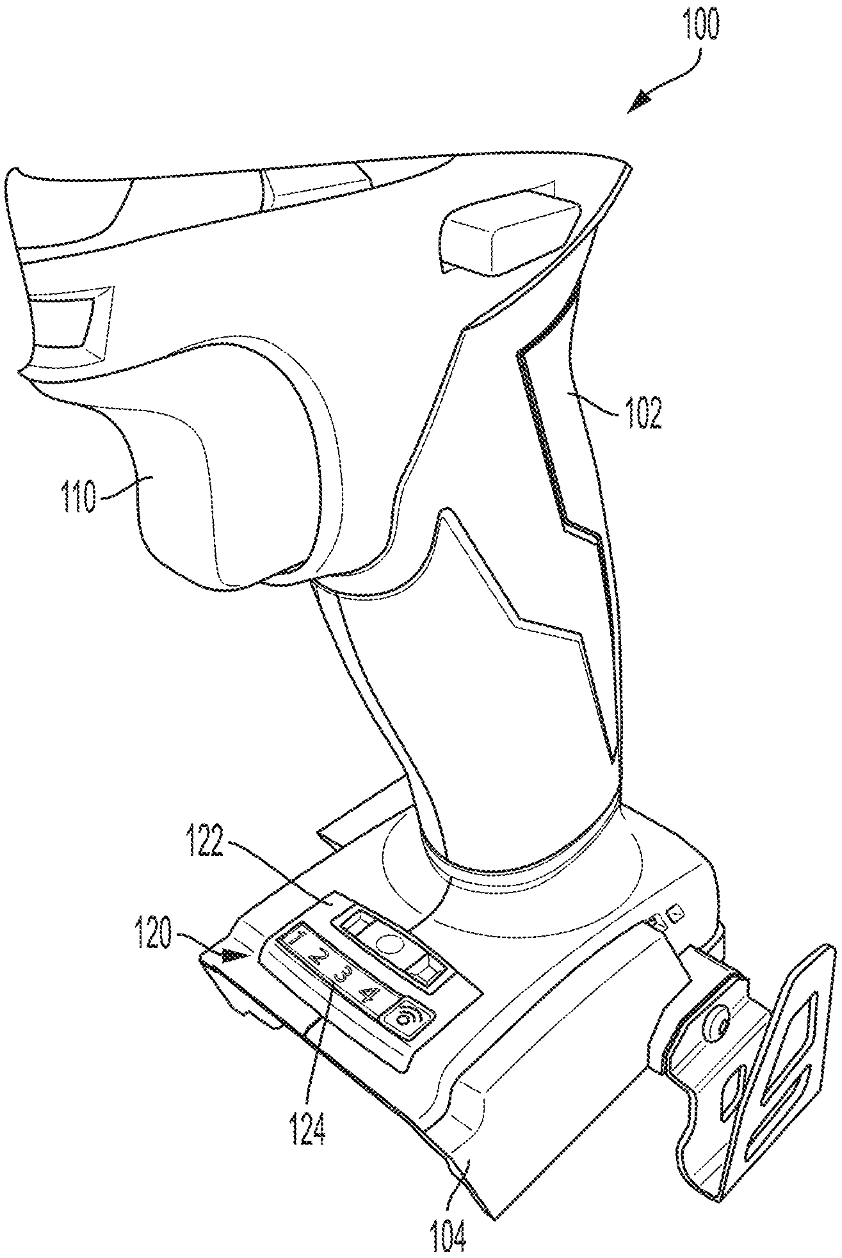

Turning to FIGS. 1A-B, an example power tool 100 is shown, according to one embodiment. The power tool includes a housing 102, a battery interface 104, a driver 106 (e.g., a chuck or bit holder), a forward-reverse selector 108, and a trigger 110. While FIG. 1A shows a specific power tool with a rotational output, the described mode selector designs are used with multiple types of power tools having a forward-reverse selector, such as drills, drivers, drill-drivers, impact drivers, impulse drivers, or hammer drill-drivers, reciprocating saws, ratchets, powered torque wrenches, crimpers, cutters, grinders, or another type of power tool that uses a an electric motor that is controlled via a user input (e.g. a trigger). In some examples, the motor is a brushless DC motor.

In one embodiment, the trigger 110 is configured to be actuated by a user to perform an operation of the power tool 100. For example, actuation of the trigger 110 provides a signal to a controller of the power tool 100, which then performs an operation. Example operations may include rotation of the driver 106. In some embodiments, the amount of actuation of the trigger 110 provides an output proportional to the amount of actuation to a controller. In one embodiment, the forward-reverse selector 108 allows a user to control the direction of a rotating portion of the power tool 100, such as the driver 106. In one embodiment, the forward-reverse selector 108 is configured to have three positions: forward, neutral, and reverse. However, in other embodiments, the forward-reverse selector 108 may have four positions: forward, neutral, mode selection, and reverse. Actuation of the forward-reverse selector between the different positions generates an output that is provided to a controller of the power tool 100, as will be described in more detail below. In the embodiment illustrated, the forward-reverse selector 108 is moveable along a translation axis extending through the housing 102 generally perpendicular to the motor and driver 106 axis of rotational. In the side-view of FIG. 1A, the axis of rotation of the motor and driver 106 extends left/right, and the translation axis of the forward-reverse selector 108 extends in/out of the page. Additionally, the power tool 100 may include a mechanical stop or detent at each position for the forward-reverse selector 108, such that the forward-reverse selector 108 will not slip or shift to a different position without external force (e.g., by a user pressing on the selector).

In some examples, certain tools, such as reciprocating saws, string trimmer, etc., may not include a forward-reverse selector. Instead, these tools may have a locking selector to lock the tool, which may be used interchangeably herein in lieu of a forward/reverse selector.

FIG. 1B provides another view of the power tool 100 showing a top-side of the battery interface 104. On the top-side of the battery interface 104 is a mode pad 120 including a mode pad selector 122 and a mode indicator 124. Actuation of the mode pad selector 122 (e.g., by a user) causes the tool 100 to switch operational modes. In some embodiments, actuation of the mode pad selector 122 is configured to switch operational modes regardless of the position of the forward-reverse selector 108. However, in some embodiments it is contemplated that the mode pad selector 122 may be omitted. The mode indicator 124 is configured to indicate the current operating mode of the power tool 100. In the embodiment illustrated, the current mode may be indicated as one selected from the group of mode 1, mode 2, mode 3, mode 4, and wireless mode. Each operational mode may be associated with various tool operational parameters, which are stored in a memory of the power tool. Generally, upon selection of a particular mode and depression of the trigger 110, the power tool 100 operates according to the stored operational parameters for the selected mode. In the wireless mode, parameters may be manipulated and set by an external device on a graphical user interface thereof based on received user input. The parameters are then transmitted wirelessly from the external device to the power tool to configure the wireless mode. The external device may further be used to transmit a command to store the parameters to overwrite parameters previously associated with one of modes 1-4. In some embodiments, the mode pad 120 is not provided on the power tool 100. In some embodiments, a different number of operational modes for the power tool 100 are included. For example, mode sets such as a mode set for application and another mode set for kickback sensitivity, LED settings, screw head type, etc.

Figure 2:
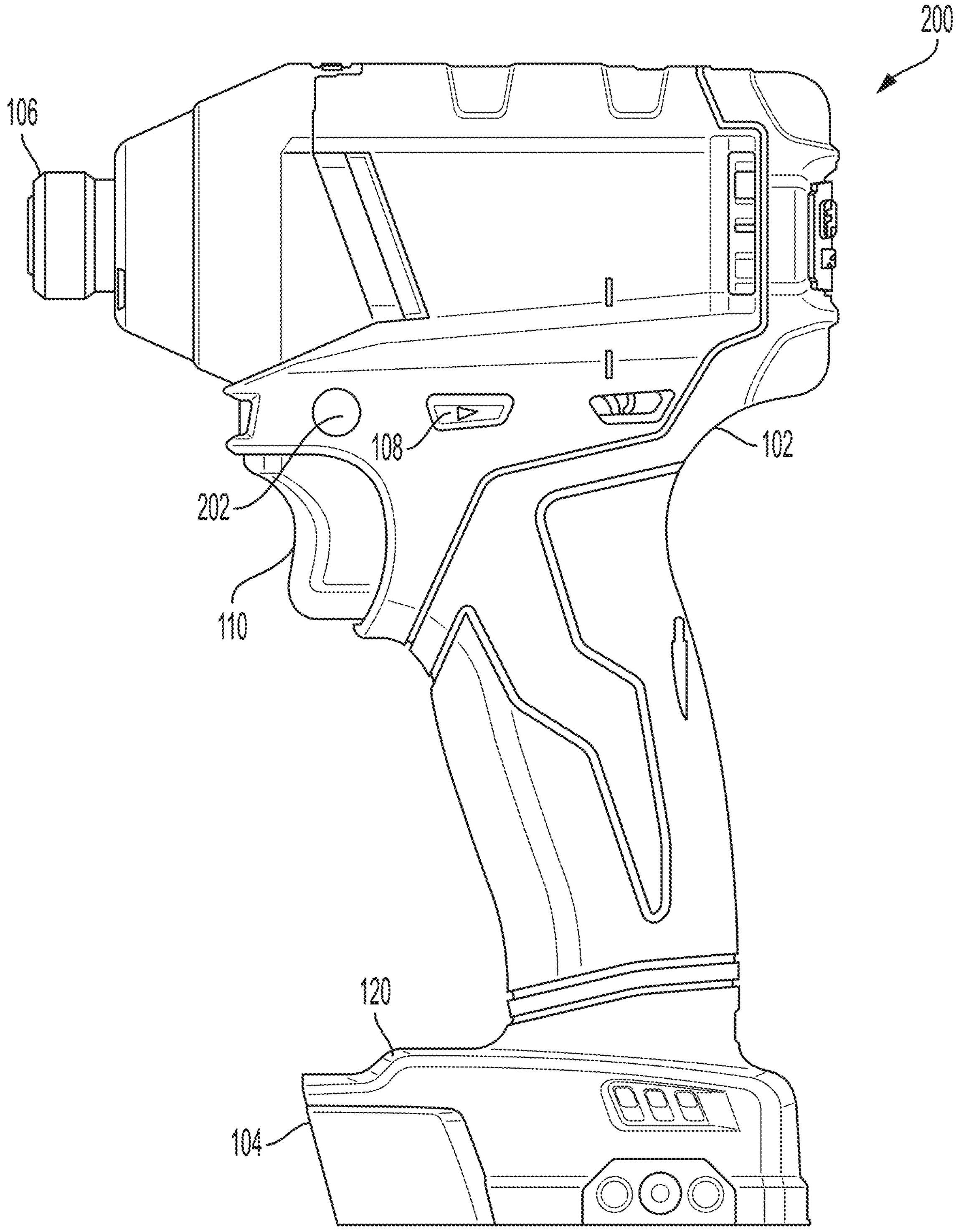
FIG. 2 is a view of a power tool having a forward-reverse shuttle and a mode selection actuator, according to some embodiments.

Turning now to FIG. 2, an example power tool 200 is shown, according to an alternative embodiment. The power tool 200 may be similar to the power tool 100 described above, and includes a housing 102, a battery interface 104, a driver 106 (e.g., a chuck or bit holder), a forward-reverse selector 108, a trigger 110, and mode pad 120. The power tool 200 may further include a mode selector 202. In some embodiments, the power tool 200 includes at least two mode selectors. The mode selector 202 may be configured to be actuated by a user, and may be a pushbutton, a touch sensitive input (e.g. capacitive input, resistive input, etc.), a knob, a rocker switch, or other input mechanism type. In some embodiments, the mode selector 202 may be positioned to allow a user to actuate the mode selector using the same finger or hand that the user uses to actuate the trigger 110. As will be described in more detail below, actuation of the mode selector 202 may provide an input to a controller of the power tool 200. While FIG. 2 shows a specific power tool with a rotational output, the described mode selector designs are used with multiple types of power tools having a forward-reverse selector, such as drills, drivers, drill-drivers, impact drivers, impulse drivers, hammer drill-drivers, reciprocating saws, ratchets, powered torque wrenches, crimpers, cutters, grinders, or another type of power tool that uses a brushless DC motor that is controlled via a user input (e.g. a trigger). Additionally, in some embodiments, the mode pad 120 is not provided on the power tool 200.

Figure 3A:
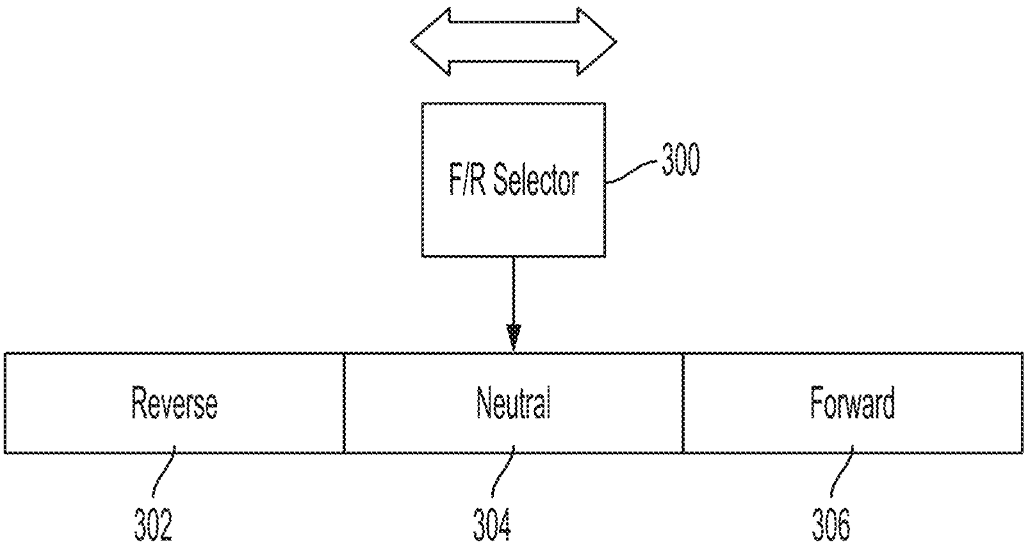
FIGS. 3A-3B are state diagrams describing movement of forward-reverse selectors, according to some embodiments.

FIG. 3A illustrates a state diagram for a three position forward-reverse selector 300. The forward-reverse selector 300 is an example of the forward-reverse selector 108 of FIGS. 1A and 2. As shown in FIG. 3A, the forward-reverse selector 300 has a reverse position 302, a neutral position 304, and a forward position 306. The forward-reverse selector 300 is shown to move linearly between the reverse position 302, the neutral position 304, and the forward position 306. In one embodiment, actuation of the forward-reverse selector 300 generates one or more outputs that are provided to a controller of the respective power tool. The output may provide an indication as to the current position the forward-reverse selector 300 is currently in, or that the forward-reverse selector 300 has transitioned from one position to another. As shown in FIG. 3A, the forward-reverse selector 300 is linearly movable in a lateral direction between the reverse position 302, the neutral position 304, and the forward position 306. However, in other examples, the forward-reverse selector 300 may be movable in other directions (e.g. rotationally, longitudinally, etc.) between the different positions.

As described above, some tools may have a lock/unlock selector instead of a forward/reverse selector. In some embodiments, actuation of lock/unlock selector generates one or more outputs that are provided to a controller of the respective power tool. The output may provide an indication as to the current position the lock/unlock selector is currently in, or that the lock/unlock actuator has transitioned from one position to another.

Figure 3B:
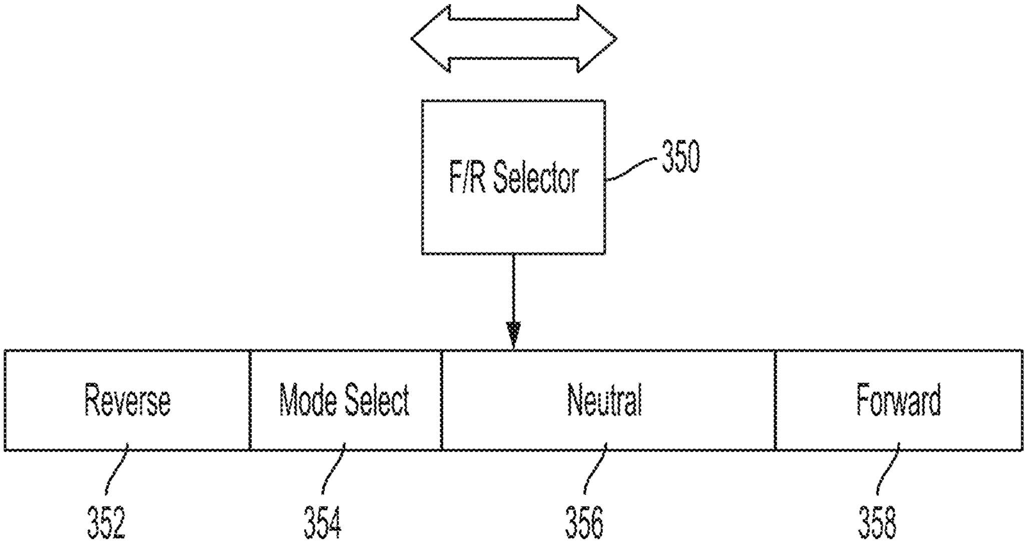

Turning now to FIG. 3B, a state diagram for a four position forward-reverse selector 350 is shown. The forward-reverse selector 350 is another example of the forward-reverse selector 108 of FIGS. 1A and 2. The forward-reverse selector 350 is movable between a reverse position 352, a mode selection position 354, a neutral position 356, and a forward position 358. While the mode select position 354 is shown as between the reverse position 352 and the neutral position 356, it is contemplated that the mode select position 354 could be configured to be located in any other position, such as the reverse position 352, the neutral position 356 and/or the forward position 358. In one embodiment, actuation of the forward-reverse selector 350 generates one or more outputs that are provided to a controller of the respective power tool. The output may provide an indication as to the current position the forward-reverse selector 350 is currently in, or that the forward-reverse selector 350 has transitioned from one position to another. As shown in FIG. 3B, the forward-reverse selector 350 is linearly movable in a lateral direction between the reverse position 352, the mode selection position 354, the neutral position 356, and the forward position 358. However, in other examples, the forward-reverse selector 350 may be movable in other directions (e.g. rotationally, longitudinally, etc.) between the different positions. For example, the forward-reverse selector 350 may be actuatable in a lateral direction between the F-N-R positions, and moveable in a longitudinal direction to transition to the mode selection position. This would allow a user to operate the forward-reverse selector normally for selecting a direction of operation or the neutral position, and then use a separate motion, e.g. the longitudinal motion to access the mode selection position. In one example the longitudinal actuation may be in an upward and/or downward direction relative to the user.

Figure 3C:
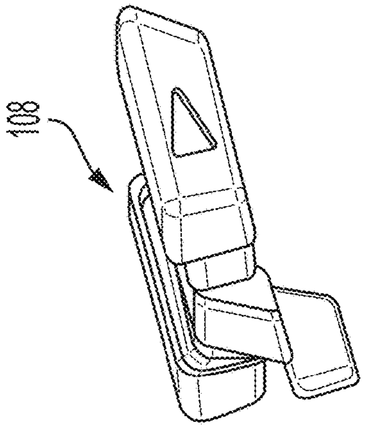
FIG. 3C illustrates a forward-reverse selector used in the tools of FIGS. 1A, 1B, and 2, according to some embodiments.

FIG. 3C illustrates the forward-reverse selector 108 separate from the power tool 100 and 200.

Figure 3D:
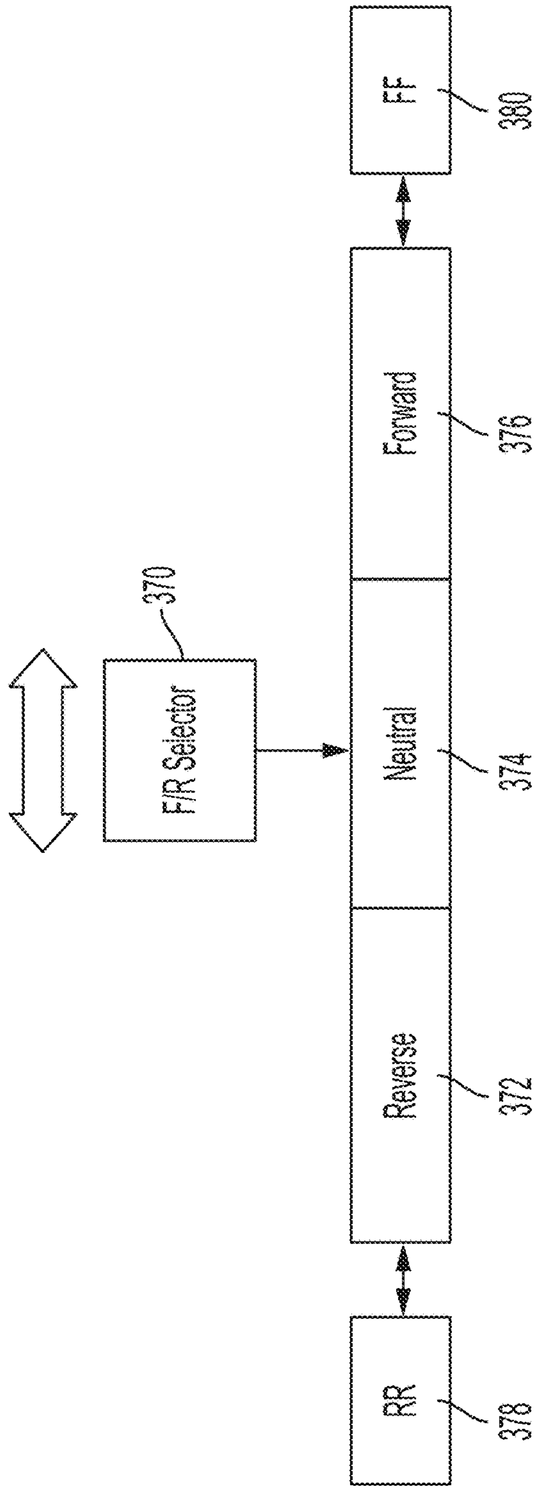
FIG. 3D is a state diagram describing movement of forward-reverse selectors, according to some embodiments.

FIG. 3D illustrates a state diagram for a five position forward-reverse selector 370, according to some embodiments. The forward-reverse selector 370 is another example of the forward-reverse selector 108 of FIGS. 1A and 2. The forward-reverse selector 370 is movable between a reverse position 372, a neutral position 374, and a forward position 376, similar to the forward-reverse selector 300 described above. The forward-reverse selector 370 is further movable to an "RR" position 378 and an "FF" position 380. The RR position 378 is accessed by a user applying a force to the forward-reverse selector 370 when in the reverse position 372 in the direction of the RR position 378. The RR position 378 may be return biased (e.g. spring biased, compressible overmold, etc.) such that a user must apply a force to the forward-reverse selector 370 to move the forward-reverse selector 370 to the RR position 378. Due to the return biasing, the forward-reverse selector 370 will return to the reverse position 372 when the user removes the applied force. Similarly, the FF position 380 is accessed by a user applying a force to the forward-reverse selector 370 when in the forward position 376 in the direction of the FF position 380. The FF position 380 may be return biased (e.g. spring, compressible overmold, etc.) such that a user must apply a force to the forward-reverse selector 370 to move the forward-reverse selector 370 to the FF position 380. Due to the return biasing, the forward-reverse selector 370 will return to the forward position 376.

In some embodiments, a long press and hold in the FF position 380 or the RR position 378 may provide a separate signal to a controller to allow for operations such as instructing the tool to ramp through its speed range. Further, the release from the FF position 380 or the RR position 378 may be configured to set a max speed of the tool, wherein the max speed would be the speed of the tool when the forward-reverse selector 370 is released from the FF position 380 and/or the RR position 378. In other embodiments, a long press in the FF position 380 or the RR position 378 can be used in a conjunction with other inputs, such as a trigger press, to activate other modes or functions.

In some embodiments, by actuating the forward-reverse selector 370 into the FF position 380 and/or the RR position 378, an input is provided to a controller of the power tool 100. In some embodiments, the forward-reverse selector 370 is used to select the FF position 380 and/or the RR position 378 multiple times to provide a request to modify a mode, setting, or operation. Possible mode, setting, and/or operational changes are described in more detail below. For example, by actuating the forward-reverse selector into the FF position 380 and/or the RR position 378 two times within one second, a first mode is selected. In the same example, by actuating the forward-reverse selector into the FF position 380 and/or the RR position 378 three times within one second, a second mode may be selected. It is contemplated that various combinations of the FF position 380 and the RR position 378 can be used to command the tool to modify one or more modes, settings, and/or operational changes. In some embodiments, a user may use either the RR position 378 or the FF position 380 to modify a mode, setting, and/or operation. However, in other embodiments, both the RR position 378 and the FF position 380 are used in combination to modify the desired mode, setting, and/or operation. Due to the return biasing of the RR position 378 and the FF position 380, a user is able to quickly provide input to the power tool 100. While the forward-reverse selector 370 is shown with both a RR position 378 and an FF position 380, it is contemplated that in some examples, the forward-reverse selector 370 may only have an FF position 380 or an RR position 378.

Figure 4:
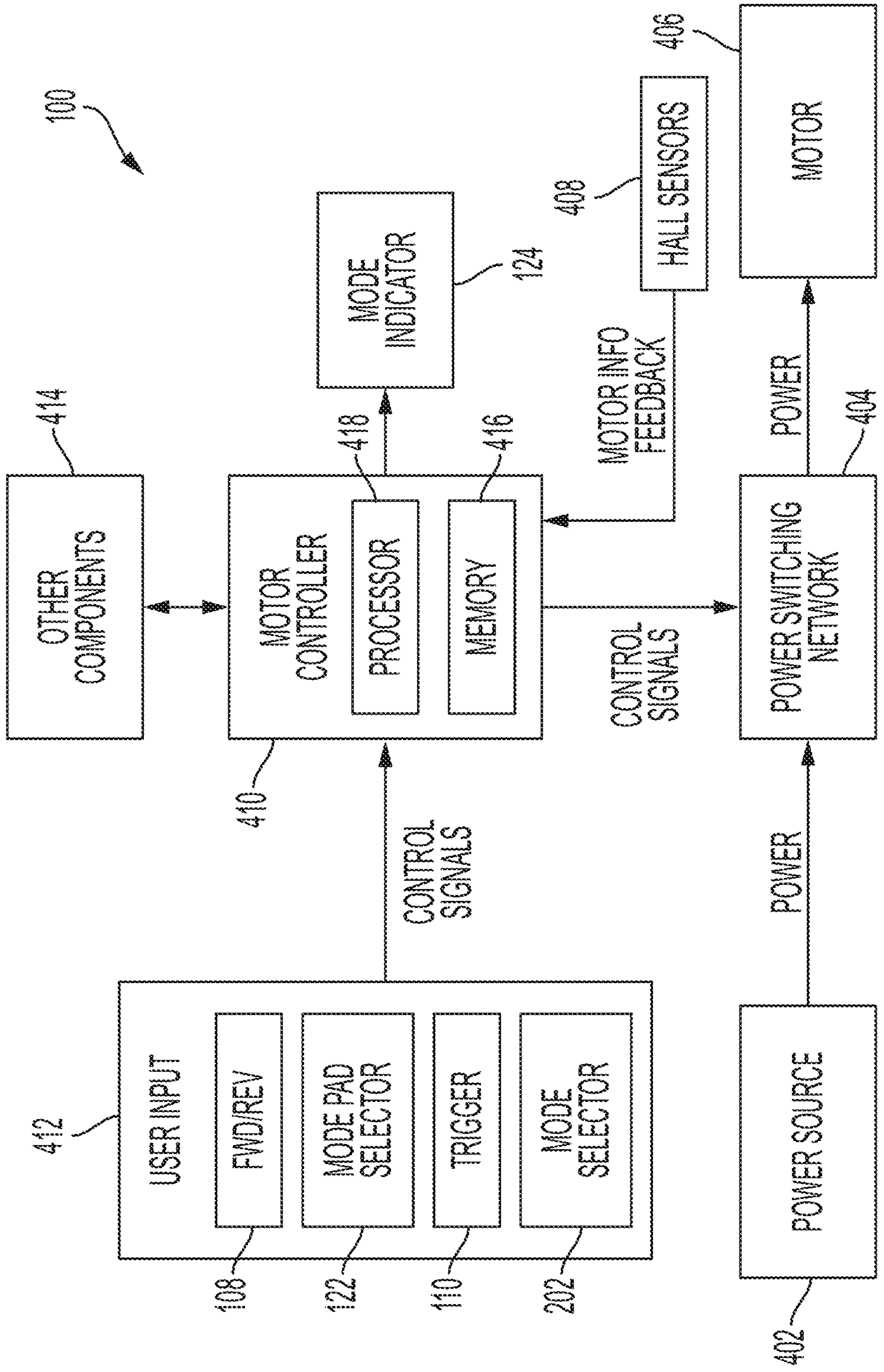
FIG. 4 is a block diagram of a brushless power tool, according to some embodiments.

Turning now to FIG. 4, a simplified block diagram of a brushless power tool, such as power tools 100, 200, is shown, according to some embodiments. While the block diagram of FIG. 4 is described in relation to the power tools 100, 200 described above, it is contemplated that the block diagram may be applicable to other power tools, such as those described herein. For purposes of brevity, the block diagram will be described in regards to power tool 100, unless otherwise indicated. The power tool 100 is shown to include a power source 402, a power switching network 404, a motor 406, Hall sensors 408, a motor controller 410, user inputs 412, and other components 414 (battery pack fuel gauge, work lights (LEDs), current/voltage sensors, etc.). The power source 402 provides DC power to the various components of the power tool 100 and may be a power tool battery pack that is rechargeable and uses, for instance, lithium ion cell technology. In some instances, the power source 402 may receive AC power (e.g., 120V/60 Hz) from a tool AC plug that is coupled to a standard wall outlet, and then filter, condition, and rectify the received power to output DC power. Each Hall sensor 408 outputs motor feedback information, such as an indication (e.g., a pulse) when a magnet of a rotor of the motor rotates across the face of that Hall sensor 408. Based on the motor feedback information from the Hall sensors 408, the motor controller 410 can determine the position, velocity, and acceleration of the rotor.

In some embodiments, the motor controller 410 includes a memory 416 for storing instructions and an electronic processor 418 coupled to the memory to retrieve and execute the instructions to thereby implement the functionality of the controller 410 described herein. The motor controller 410 is also configured to receive control signals from the user inputs 412, such as by actuation of the trigger 110, actuation of the forward-reverse selector 108, actuation of the mode selector 202, or actuation of the mode pad selector 122. An output associated with the operation of the user inputs 412 may be provided to the motor controller 410 as described above. The outputs from the user inputs may be digital signals, analog signals, or a combination thereof.

In one embodiment, the motor controller 410 may be configured to operate the tool in different operational modes. For example, the motor controller 410 is configured to operate the tool in various fastener modes (e.g., self-tapping screw, deck screw, concrete screw, drywall screw, etc.), speed modes (e.g., high, medium, low), torque modes (high, medium, low), and the like. For each mode, one or more motor parameters for driving the motor are specified, such as: motor speed, motor maximum speed, motor minimum speed, motor torque, motor maximum torque, motor minimum speed torque, ramp up time or acceleration to get to desired speed, run time before motor shut off, number of impacts before motor shut off, number of impacts before speed up, number of impacts before motor slow down, maximum current before motor shut off, maximum current before motor slow down, and the like.

Figure 5:
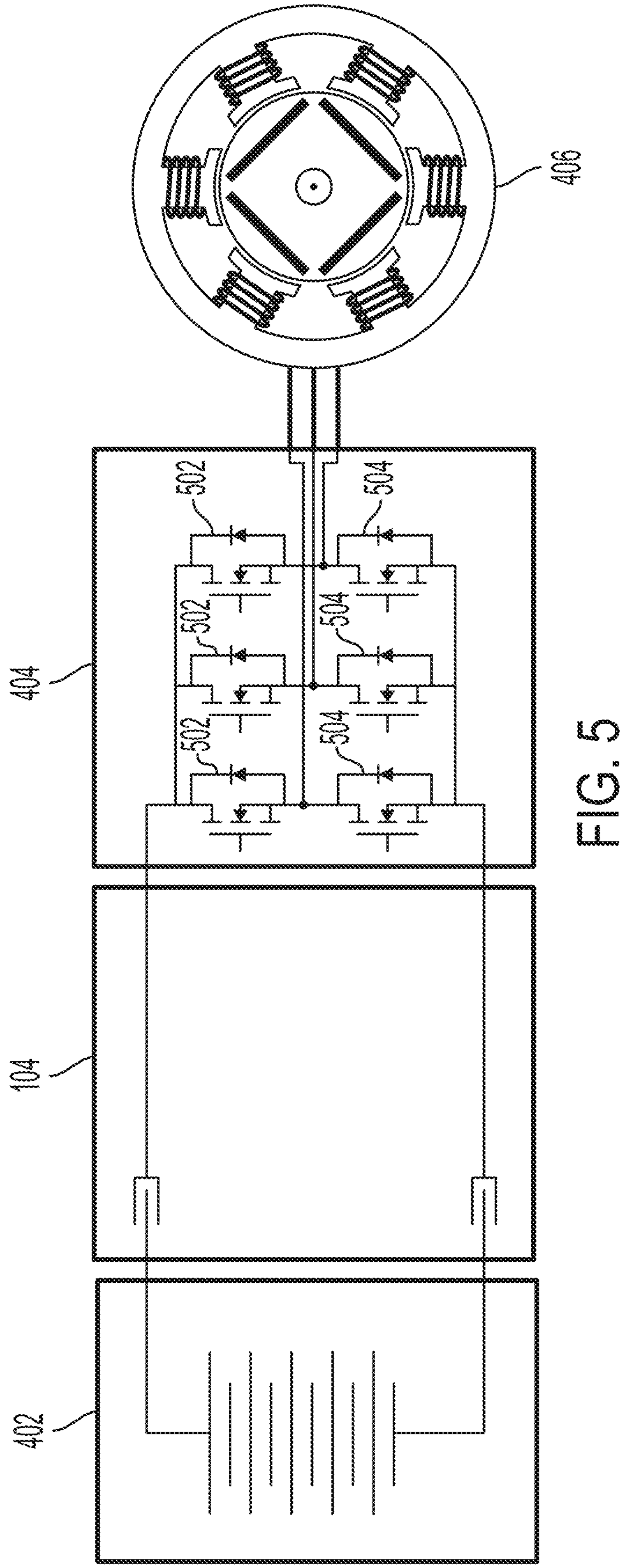
FIG. 5 is a circuit diagram of the power switching network described in FIG. 4, according to some embodiments.

In response to the control signals received via the user inputs 412, the motor controller 410 transmits control signals to the power switching network 404 to drive the motor 406, as explained in further detail with respect to FIG. 5. In some embodiments, the power tool 100 may be a sensorless power tool that does not include Hall sensors 408 or other position sensors to detect the position of a rotor of the motor 406. Rather, the rotor position may be detected based on the inductance of the motor 406 or the back electromotive force (emf) generated in the motor 406. Although, not shown, the motor controller 410 and other components of the power tool 100 are electrically coupled to the power source 402 such that the power source 402 provides power thereto.

FIG. 5 illustrates a circuit diagram of the power switching network 404. The power switching network 404 includes a number of high side power switching elements 502 (for example, field effect transistors (FETs)) and a number of low side power switching elements 504 (for example, FETs). The motor controller 410 provides the control signals to control the high side FETs 502 and the low side FETs 504 to drive the motor based on the motor feedback information and user controls, as noted above. For example, in response to detecting a pull of the trigger 110, and the input from forward-reverse selector 108, the motor controller 410 provides the control signals to selectively enable and disable the FETs 502 and 504 (e.g., sequentially, in pairs) resulting in power from the power source 402 to be selectively applied to stator coils of the motor 406 to cause rotation of a rotor. More particularly, to drive the motor 406, the motor controller 410 enables a first high side FET 502 and first low side FET 504 pair (e.g., by providing a voltage at a gate terminal of the FETs) for a first period of time. In response to determining that the rotor of the motor 406 has rotated based on a pulse from the Hall sensors 408, the motor controller 410 disables the first FET pair, and enables a second high side FET 502 and a second low side FET 504. In response to determining that the rotor of the motor 406 has rotated based on pulse(s) from the Hall sensors 408, the motor controller 410 disables the second FET pair, and enables a third high side FET 502 and a third low side FET 504. This sequence of cyclically enabling pairs of high side FET 502 and low side FET 504 repeats to drive the motor 406. Further, in some embodiments, the control signals include pulse width modulated (PWM) signals having a duty cycle that is set in proportion to the amount of trigger pull of the trigger 110, to thereby control the speed or torque of the motor 406.

Figure 6A:
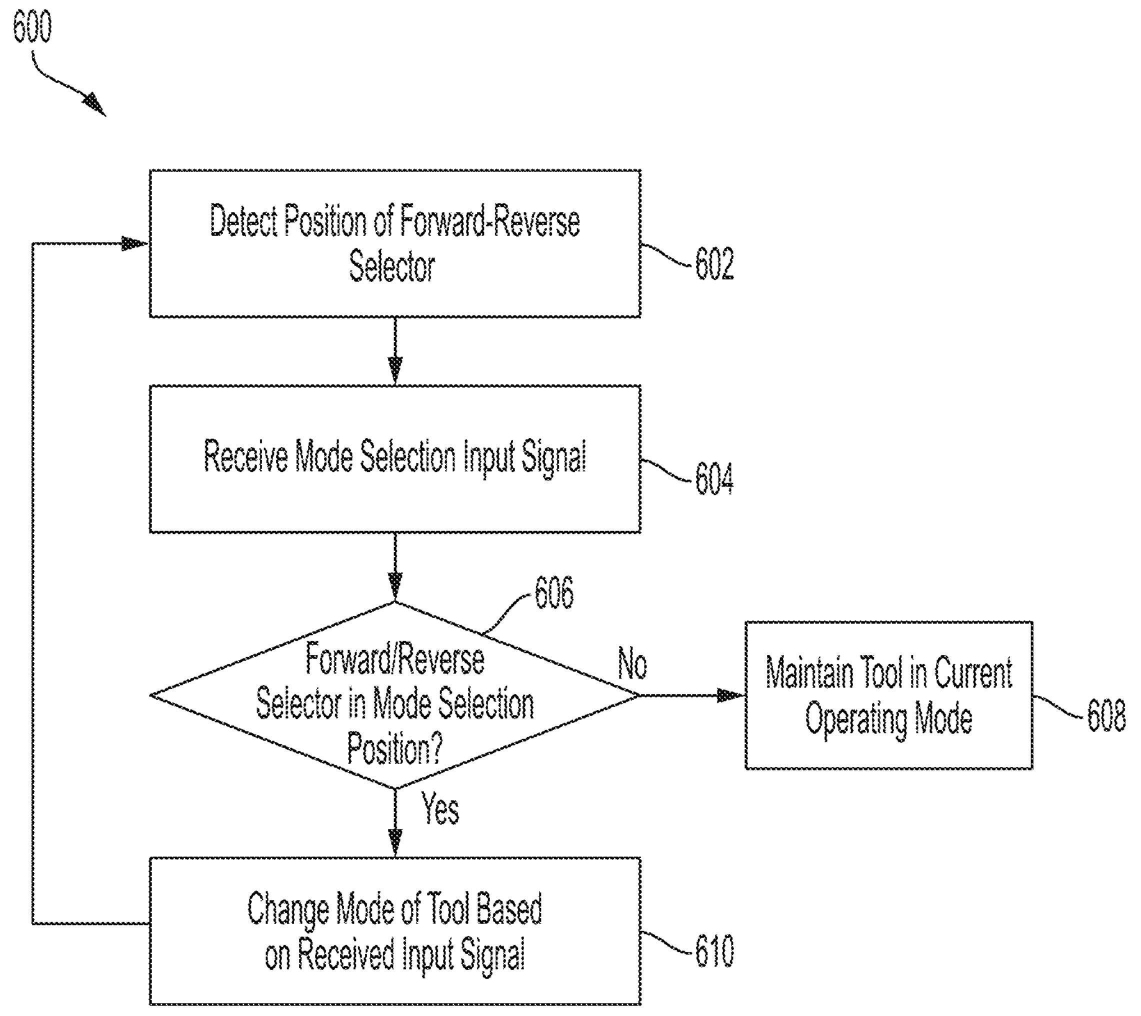
FIGS. 6A, 6B, and 6C are flow charts illustrating processes for modifying the operating mode of an electric power tool, according to some embodiments.

Turning now to FIG. 6A, a process 600 for modifying a mode, setting and/or operation of a power tool is described, according to some embodiments. The process 600 is described as being performed by the power tools of FIGS. 1 and 2, as well as the associated block diagram of FIG. 4. However, the process 600 may be executed by various other power tools, such as those described herein. In one example, the process 600 is executed by a controller of a power tool, such as motor controller 410.

At process block 602, the motor controller 410 detects a position of the forward-reverse selector 108. As described above, the forward-reverse selector 108 may have multiple positions. Specifically, the forward-reverse selector 108 may be a three position forward-reverse selector (forward-neutral-reverse), or a four position forward-reverse selector (forward-mode select-neutral-reverse). As described above, the forward-reverse selector 108 may be electrically coupled to the motor controller 410 and provides an input to the motor controller 410 indicating the position of the forward-reverse selector 108. For example, the forward-reverse selector 108 may include a voltage divider that provides a different voltage level as the input to the motor controller 410 depending on the position of the selector. Based on the input to the motor controller 410, a position of the forward-reverse selector 108 is determined.

At process block 604, the motor controller 410 receives a mode selection input signal from a mode selector. In one embodiment, the mode selection input signal is transmitted by the trigger 110. For example, actuation of the trigger 110 by a user provides a mode selection input. In one embodiment, the mode selection input signal is a signal from (and indicating) a single actuation. In other embodiments, the mode selection input signal includes multiple signals from (and indicating) multiple actuations. In still further embodiments, the mode selection input signal may include one or more signals from (and indicating) a one or more particular trigger actuations, such as one or more trigger pulls of different lengths (e.g. long duration actuation, short duration actuation, combination of long/short actuations, etc.). In other embodiments, the mode selection input signal is transmitted by the mode selector 202. Similar to the trigger 110, actuation of the mode selector 202 may produce a single input signal, a number of input signals (based on a number of actuations), or a combination of signals based on a combination of actuations (e.g. long duration actuation, short duration actuation, combination of long/short actuations, etc.). The trigger 110 and/or the mode selector 202 are configured to provide a mode selection input signal to the motor controller 410, as described above. The particular form of the signals may vary by embodiment.

In one embodiment, the signal may be an analog signal in which a voltage indicates either that the trigger 110 (or mode selector 202) is actuated (e.g., when at 5 volts) or not actuated (e.g., when at 0 volts). In another embodiment, the signal may be an analog signal in which a voltage corresponds to a mode setting (such as speed). In another embodiment, the signal may be an analog signal in which a voltage corresponds to which mode is to be selected. In still another embodiment, the signal may be an analog signal in which an especially sustained voltage allows a blend between the modes (e.g. mode 2.5 is in-between mode 2 and mode 3). The voltage signals may be provided by actuation of the trigger 110 (or mode selector 202) closing a switch coupled to a voltage source and releasing the trigger 110 (or mode selector 202) to open the switch. Different input actuation-controlled signal generator are used in other embodiments, such as potentiometers, Hall sensors, capacitive sensors, and the like.

At process block 606, the motor controller 410 determines if the forward-reverse selector 108 is in a mode selection position. In embodiments where the power tool 100 includes a three position forward-reverse selector, as described above, the mode selection position is the neutral position (see FIG. 3A). In embodiments where the power tool 100 includes a four position forward-reverse selector, the mode selection position is the mode selection, or fourth, position (see FIG. 3B). Based on the motor controller 410 determining that the forward-reverse selector is not in the mode selection position, the motor controller 410 does not modify or change the current operating mode of the tool and, rather, maintains the tool in the current operating mode (a first operating mode) at process block 608.

In response to the motor controller 410 determining (in block 606) that the forward-reverse selector 108 is in the mode selection position, the motor controller 410 (in block 610) modifies a mode of the tool based on the received mode selection input signal. In one embodiment, the motor controller 410 modifies the operating mode of the power tool from a current (first) operating mode to a different (second) operating mode. For example, the motor controller 410 may modify the operating mode of the tool to one of the example modes listed above. In one embodiment, the motor controller 410 may cycle between operating modes of the tool based on receiving a single mode selection input. For example, the motor controller 410 switches to a different operating mode based on receiving a single mode selection input (e.g. a single actuation of the mode selector 202 and/or the trigger 110). After changing the operating mode, the motor controller 410 returns to process block 602.

In other embodiments, the motor controller 410 modifies the mode of the tool at process block 610 based on a number of input signals received within a predetermined time. For example, based on a user actuating the trigger 110 and/or the mode selector 202 two times within the predetermined time, when the forward-reverse selector 108 is in the mode selection position, the motor controller 410 modifies the operating mode to a first operating mode. Alternatively, based on the user actuating the trigger 110 and/or the mode selector 202 three times within the predetermined time, when the forward-reverse selector 108 is in the mode selection position, the motor controller 410 modifies the operating mode to a second operating mode. In other examples, different numbers of actuations over the predetermined time are also contemplated. In one embodiment, the predetermined time is one second. However, in other embodiments, predetermined times of more than one second or less than one second are used. In some embodiments, a first actuation of the trigger 110 and/or the mode selector 202 may illuminate an indicator light on the tool, such as a job light, or a light on the mode indicator 124 where the forward-reverse selector 108 is in the mode selection position. If the light is on, a subsequent actuation, or multiple actuations, of the trigger 110 and/or the mode selector 202 will modify the operating mode. In some embodiments, the mode indicator 124 provides an indication of the current mode and/or the selected mode.

In still further embodiments, the motor controller 410 modifies the mode of the tool at process block 610 based on a combination of input signals received within a predetermined time. For example changing the mode may be based on a user actuating the trigger 110 and/or the mode selector 202, and the forward-reverse selector 108 is in the mode selection position, using a specific combination of actuations (e.g. long duration actuations, short duration actuations, etc.) the motor controller 410 modifies the operating mode based on the combination of received actuations. Example combinations may include two long duration actuations and one short duration actuation received within the predetermined time for a first operating mode, and one long duration actuation and two short duration actuations received within the predetermined time for a second operating mode. However, multiple different combinations of actuations are contemplated. In some embodiments, each combination is associated with a specific mode. In other embodiments, the user may be able to configure what combinations are associated with what mode, to allow the user to be able to quickly access their most used modes. Long duration actuations may be actuations that are longer than one second, and short duration actuations may be actuations that are shorter than one second. In one embodiment, the predetermined time is five seconds; however, in other embodiments, predetermined times of more than five seconds and less than five seconds are used.

In some embodiments, the process 600 is entered in response to actuation of the mode selector of the power tool (e.g., the trigger 110 of the power tool 100 or the mode selector 202 of the power tool 200) or movement of the forward-reverse selector 108 to a different position. After the mode of the power tool is selected by the motor controller 410 based on the process 600, the power tool operates in the selected mode.

For example, when the forward-reverse selector 108 is in the "forward" position, the motor controller 410 will operate the motor 406 in a forward direction in accordance with the selected mode based on the actuation of the trigger 110. When the forward-reverse selector 108 is in the "reverse" position, the motor controller 410 will operate the motor 406 in the reverse direction in accordance with the selected mode based on the actuation of the trigger 110. When the forward-reverse selector 108 is in the "neutral" position, and the forward-reverse selector 108 is a four position forward-reverse selector, the motor controller 410 will not operate the motor 406, regardless of the actuation of the trigger 110. When the forward-reverse selector 108 is in the "neutral" position and is a three position forward-reverse selector, or when the forward-reverse selector 108 is in the "mode select" position and is a four position forward-reverse selector, the motor controller 410 will execute the process 600. One or more process blocks in the process 600 may be executed in a different order than shown, or may be executed in parallel or partially in parallel. For example, in some embodiments, block 604 is executed before block 602, and in some embodiments, decision block 606 is executed before block 604.

Accordingly, after changing the mode in block 610 (i.e., from a first operating mode to a second operating mode), and while the power tool is still in the second operating mode, the motor controller 410 may determine that the forward-reverse selector is in a forward mode position or a reverse mode position; determine that the trigger of the power tool is actuated while the forward-reverse selector is in the forward mode position or the reverse mode position; and operate the motor of the power tool in the second operating mode in response to determining that the trigger is actuated while the forward-reverse selector is in the forward mode position or the reverse mode position. The motor controller 410 may then again execute process 600 in response to actuation of the mode selector of the power tool (e.g., the trigger 110 of the power tool 100 or the mode selector 202 of the power tool 200) or movement of the forward-reverse selector 108 to a different position.

Figure 6B:
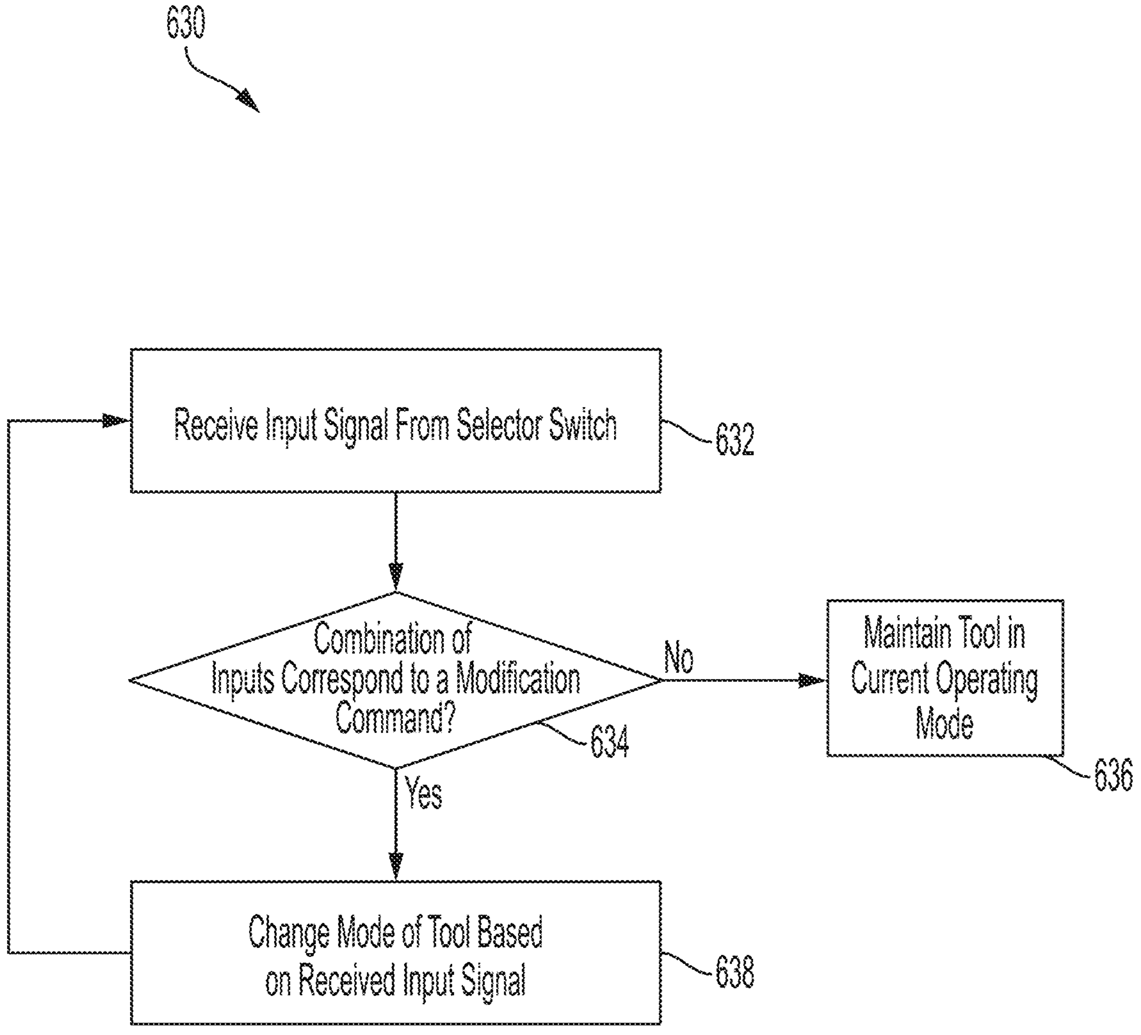

Turning now to FIG. 6B, a process 630 for modifying a mode, setting, and/or operation of a power tool is described, according to some embodiments. The process 630 is described as being performed by the power tools of FIGS. 1 and 2, as well as the associated block diagram of FIG. 4. However, the process 630 may be executed by various other power tools, such as those described herein. In one example, the process 630 is executed by a controller of a power tool, such as motor controller 410 described above.

At process block 632, the motor controller 410 receives an input signal via the forward-reverse selector 108. For purposes of the process 630, the forward-reverse selector 108 has three positions (Forward-Neutral-Reverse). As described above, the forward-reverse selector 108 may be electrically coupled to the motor controller 410 and provide an input to the motor controller 410 indicating the position of the forward-reverse selector 108. For example, the forward-reverse selector 108 may include a voltage divider that provides a different voltage level as the input to the motor controller 410 depending on the position of the selector. Based on the input to the motor controller 410, a position of the forward-reverse selector 108 is determined. In some embodiments, the motor controller 410 receives an input from the forward-reverse selector 108 upon the forward-reverse selector 108 being moved from one position to another position.

At process block 634, the motor controller 410 determines if a combination of inputs have been received at the motor controller 410 that correlate to a mode, setting, and/or operation change or modification. In one embodiment, the motor controller 410 determines if the combination of inputs have been received at the motor controller 410 within a predefined period of time. In one embodiment, the predefined period of time is one second. However, predefined periods of time of more than one second and less than one second are also contemplated. For example, the forward-reverse selector 108 may be actuated from the forward position to the reverse position to the forward position within the predefined time period to indicate a first mode selection. Similarly, the forward-reverse selector 108 may be actuated from the reverse position to the forward position to the reverse position within the predefined time period to indicate a second mode selection. The above examples represent only two possible combinations of actuations of the forward-reverse selector 108 that may be input to the motor controller 410 to effectuate the modification of a mode, setting, and/or operation of the power tool 100. In some embodiments, the combinations of inputs are associated with a specific mode, setting, or operation modification. However, in other embodiments, the combination of inputs may be used to cycle through different modes, settings, and/or operations that are available to the user. Modifications of modes, settings, and/or operations may include the modes, settings, and/or operations described herein. Modifying a mode may include cycling of modes, switching to a last used mode, jumping to a specific mode, a transition from one mode to another, etc.

In response to the motor controller 410 determining that the combination of inputs received do not correspond to a modification command, the motor controller 410 continues operating the tool using the currently existing mode, setting, and/or operation at process block 636. In response to motor controller 410 determining that the combination of inputs received do correspond to a modification command, the motor controller 410 modifies a mode, setting, and/or operation of the tool based on the received combination of inputs at process block 638.

Figure 6C:
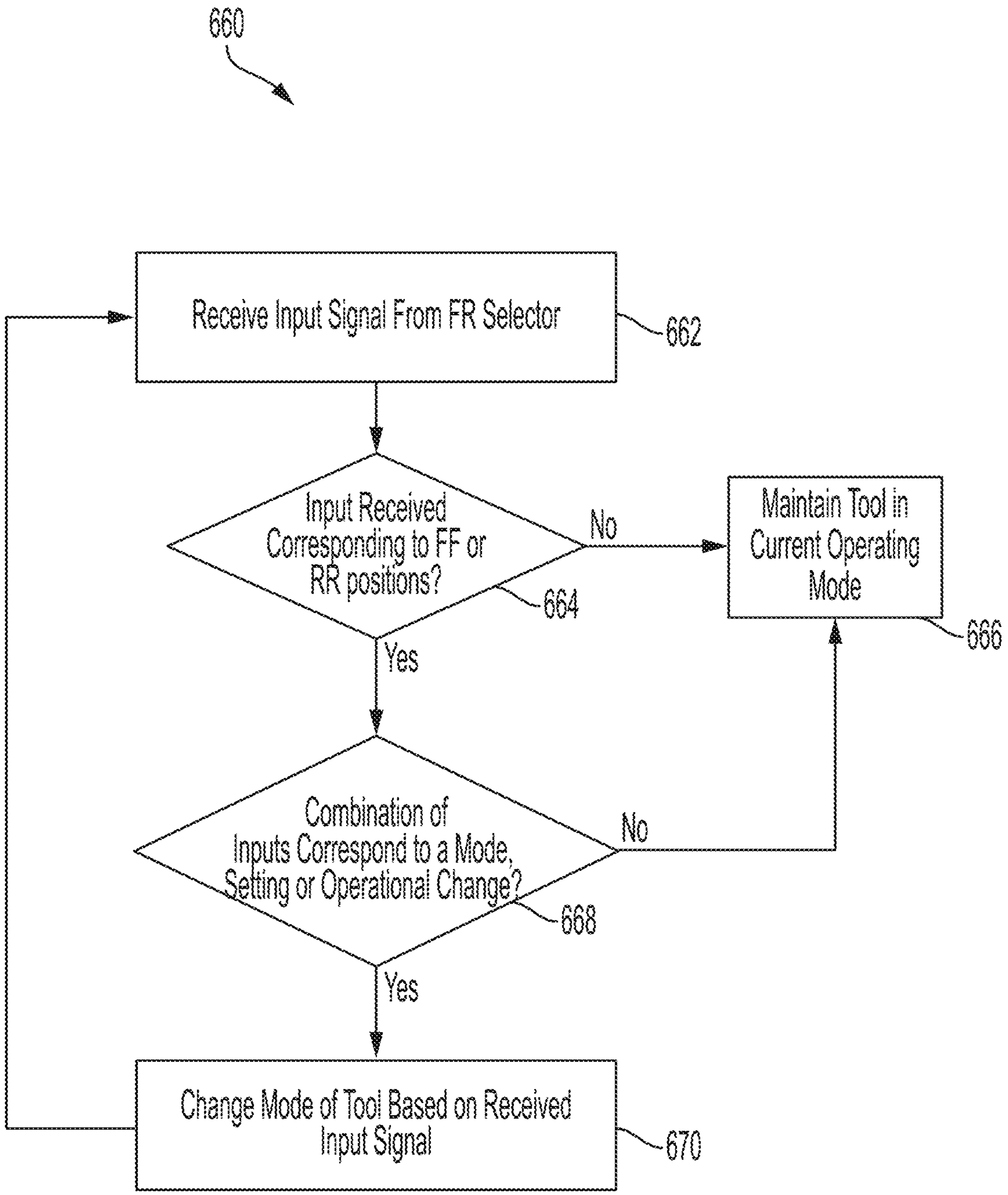

Turning now to FIG. 6C, a process 660 for modifying a mode, setting, and/or operation of a power tool is described, according to some embodiments. The process 660 is described as being performed by the power tools of FIGS. 1 and 2, as well as the associated block diagram of FIG. 4. However, the process 660 may be executed by various other power tools, such as those described herein. In one example, the process 660 is executed by a controller of a power tool, such as motor controller 410 described above.

At process block 662, the motor controller 410 receives an input signal via the forward-reverse selector 108. For purposes of the process 660, the forward-reverse selector 108 has five positions (FF-Forward-Neutral-Reverse-RR), such as described in regards to FIG. 3D, above. As described above, the forward-reverse selector 108 may be electrically coupled to the motor controller 410 and provides and input to the motor controller 410 indicating the position of the forward-reverse selector 108. For example, the forward-reverse selector 108 may include a voltage divider that provides a different voltage level as the input to the motor controller 410 depending on the position of the selector. In some examples, the forward-reverse selector 108 may output a discrete and/or digital value when moved into the FF or RR positions. In further examples, the forward-reverse selector may output a first digital value to a first input of the motor controller 410 when moved into the FF position, and a second digital value to a second input of the motor controller when moved into the RR position.

At process block 664, the motor controller 410 determines if any inputs were received from the forward-reverse selector 108 that correspond to the FF and/or the RR positions. As described above, the forward-reverse selector 108 may be configured to output specific values to the motor controller 410 when the forward-reverse selector 108 is placed in the FF and or RR position. In response to determining that the received input did not correspond to the forward-reverse selector 108 being placed in the FF or RR position, the motor controller 410 maintains the current operational status of the tool at process block 666.

In response to determining that the received input did corresponds to the forward-reverse selector 108 being placed in the FF or RR position, the motor controller 410 determines if a combination of inputs from the FF and/or RR positions correspond to an instruction to modify a mode, setting, and/or operation of the power tool at process block 668. As described above, combinations of the FF and/or RR positions may correspond to specific modes, settings, or operations. Alternatively, combinations of the FF and/or RR positions may correspond to cycling between predetermined modes, settings, and/or operations. The combinations may include combinations of FF position inputs, RR position inputs, and/or a combination of both RR and FF inputs. In some embodiments, the combination of FF and/or RR positions is required to be input within a predetermined time period. In one embodiment, the predetermined time period is one second. However, predetermined time periods of more than one second or less than one second are also contemplated. Modifications of modes, settings, and/or operations may include those modes, settings, and/or operations described herein. Modifying a mode may include cycling of modes, switching to a last used mode, jumping to a specific mode, a transition from one mode to another, etc.

In response to determining that the received combination of inputs did not correspond to a command to modify a mode, setting, and/or operation of the power tool at process block 668, the motor controller 410 maintains the current operational status of the tool at process block 666. In response to the motor controller 410 determining that the combination of inputs received do correspond to a modification command, the motor controller 410 modifies a mode, setting and/or operation of the tool based on the received combination of inputs at process block 670.

Figure 7:
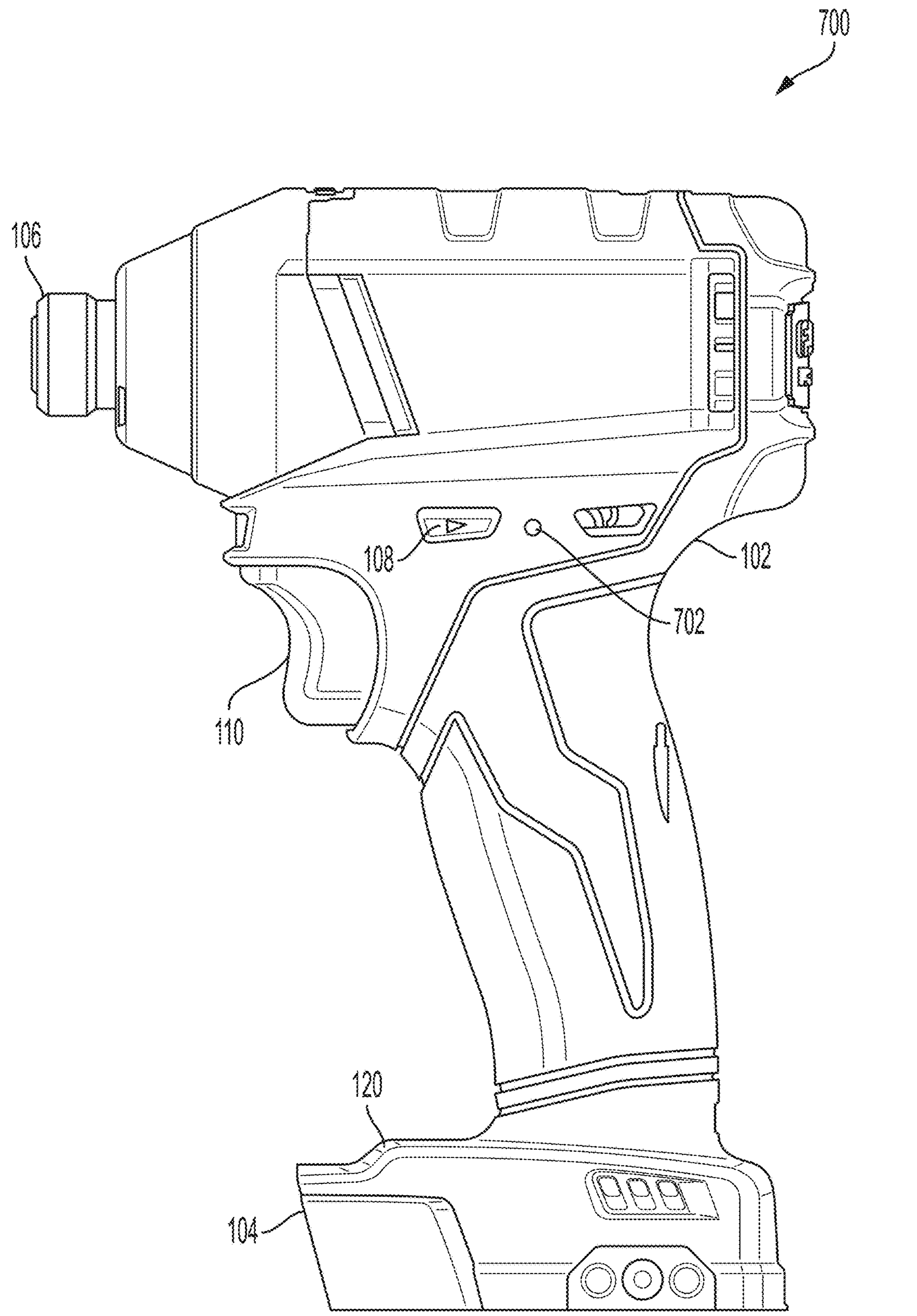
FIG. 7 is a view of a power tool having a forward-reverse shuttle and a microphone, according to some embodiments.

Turning now to FIG. 7, an example power tool 700, similar to power tool 100 is shown, according to some embodiments. Similar to the power tool 100, the power tool 700 includes a housing 102, a battery interface 104, a driver 106 (e.g., a chuck or bit holder), a forward-reverse selector 108, and a trigger 110. As shown in FIG. 7, the power tool 700 also includes a microphone 702. The microphone is configured to provide voice inputs and commands to a controller of the power tool 700, as will be described below. While the microphone 702 is shown as located on the housing 102 of the power tool 700 near the forward-reverse selector, it is contemplated that the microphone may be located in other locations of the power tool 700, such as on the front, top, side, or rear of the motor housing, the handle, or the foot of the tool.

Figure 8:
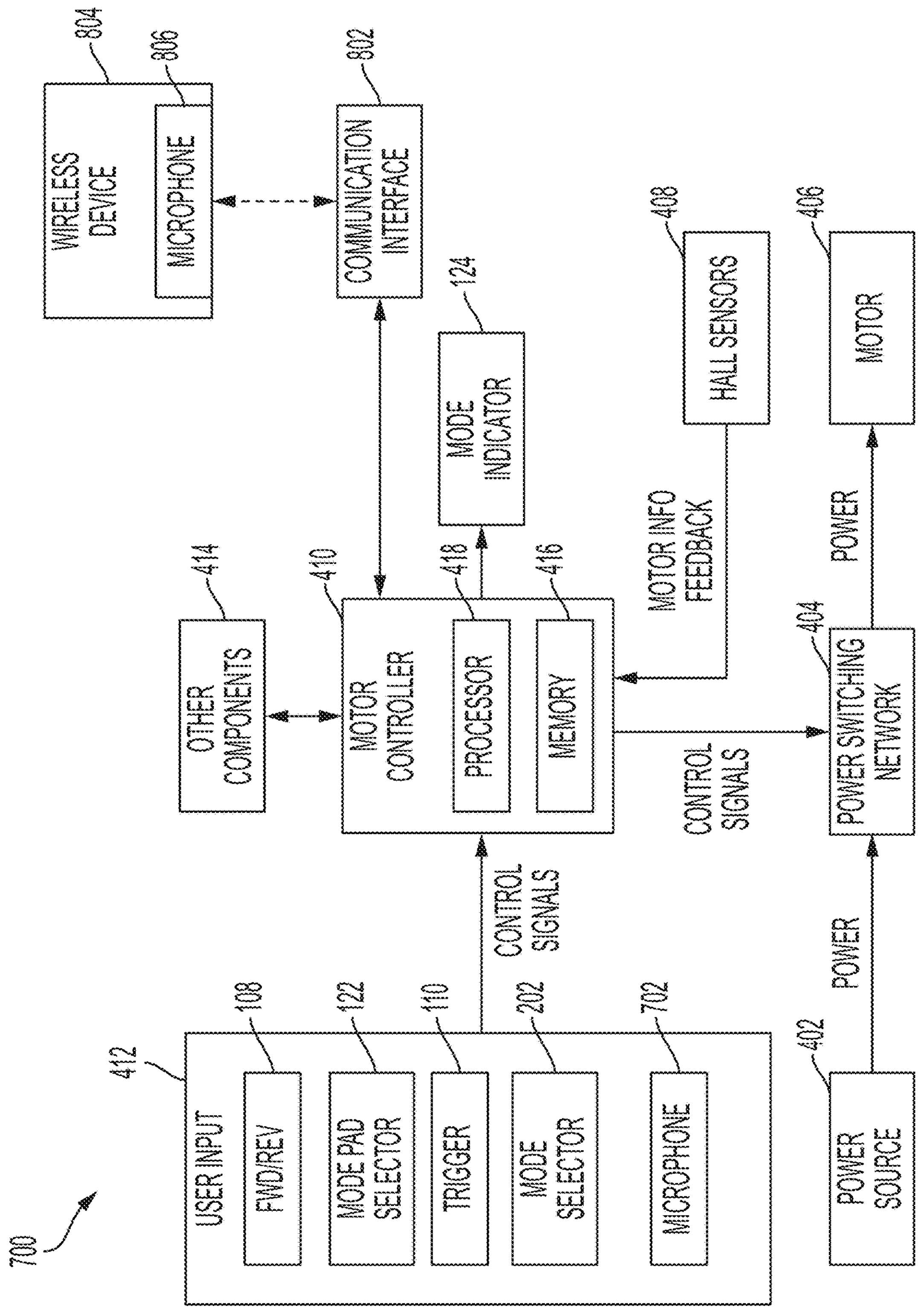
FIG. 8 is a block diagram of a brushless power tool configured to receive audio commands, according to some embodiments.

Turning now to FIG. 8, a simplified block diagram of a brushless power tool, such as power tool 700, is shown, according to some embodiments. While the block diagram of FIG. 8 is described in relation to power tool 700 described above, it is contemplated that the block diagram may be applicable to other power tools, such as power tools 100, 200 described above, or others as described herein. The block diagram includes similar components to the block diagram of FIG. 4 described above. Thus, for the sake of brevity, it is understood that the common components between the block diagram of FIG. 8 and the block diagram of FIG. 4 perform the same functions, unless otherwise noted. Similar to the block diagram of FIG. 4, the block diagram of FIG. 8 includes a power source 402, a power switching network 303, a motor 406, Hall sensors 408, a motor controller 410, user inputs 412, and other components 414. The user inputs may include inputs from the forward-reverse selector 108, the mode pad selector 122, the trigger 110, the mode selector 202, the microphone 702, or a combination thereof.

The block diagram further includes a communication interface 802 in wireless communication with a wireless device 804. The wireless device 804 may be a smart device, such as a smartphone (e.g. iPhone, Android phone, Windows phone), a tablet computer (e.g. iPad, Android Tablet, Windows Surface, etc.), a smart watch, a connected hard hat (e.g. a hard hat with electronics for sensing conditions, such as an impact, and a communication device for communicating with an external device.), a personal computer, or one or more dedicated purpose devices. The wireless device 804 may also include a microphone 806 for receiving voice commands or other audio inputs. The communication interface 802 may be configured to facilitate the transfer of messages between the motor controller 410 and the wireless device 804 using various communication protocols. In one embodiment, the communication interface 802 is configured to communicate with the wireless device 804 using Bluetooth and/or Bluetooth Low Energy (BLE). However, other wireless communication protocols, such as Wi-Fi, Near Field Communication (NFC), cellular (e.g. 3G, 4G, 5G, LTE, CDMA, etc.), RF, ZigBee, LoRa, or other applicable wireless communication protocols are also contemplated. In some embodiments, a user provides a voice input to the wireless device 804, via the microphone 806, which is then transmitted to the motor controller 410 via the communication interface 802. In other embodiments, one or more parameters, configurations, errors, settings, or other data associated with the power tool 700 may be transmitted to the wireless device 804, via the communication interface 802, for display to a user.

Figure 9:
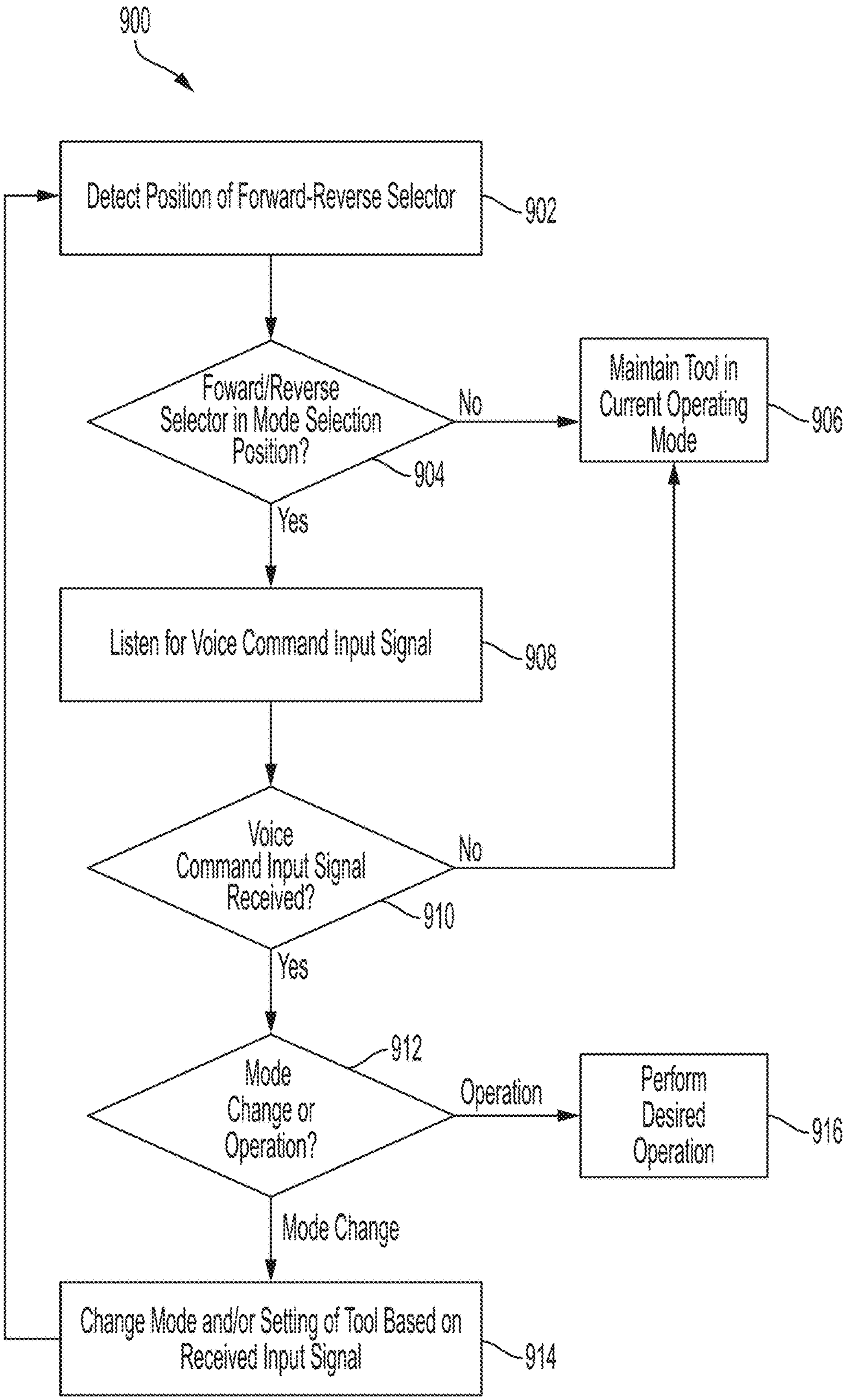
FIG. 9 is a flowchart illustrating a process for using voice commands and a forward-reverse selector to control a power tool, according to some embodiment.

Turning now to FIG. 9, a process 900 for using voice commands to control a power tool, such as power tool 700, is shown, according to some embodiments. The process 900 is described as being performed by the power tool 700, as well as the associated block diagram of FIG. 8. However, the process 900 may be executed by various other power tools, such as those described herein. In one example, the process 900 is executed by a controller of a power tool, such as motor controller 410. In some embodiments, by utilizing voice commands, a user is able to access more modes than in other examples, such as by using the F/R selector solely to select a mode.

At process block 902, the motor controller 410 detects a position of the forward-reverse selector 108. As described above, the forward-reverse selector 108 may have multiple positions. Specifically, the forward-reverse selector 108 may be a three position forward-reverse selector (forward-neutral-reverse), or a four position forward-reverse selector (forward-mode select-neutral-reverse). As described above, the forward-reverse selector 108 may be electrically coupled to the motor controller 410 and provide an input to the motor controller 410 indicating the position of the forward-reverse selector 108. For example, the forward-reverse selector 108 may include a voltage divider that provides a different voltage level as the input to the motor controller 410 depending on the position of the selector. Based on the input to the motor controller 410, a position of the forward-reverse selector 108 is determined.

At process block 904, the motor controller 410 determines whether the forward-reverse selector 108 is in a mode selection position. In embodiments where the power tool 100 includes a three position forward-reverse selector, as described above, the mode selection position is the neutral position (see FIG. 3A). In embodiments where the power tool 100 includes a four position forward-reverse selector, the mode selection position is the mode selection, or fourth, position (see FIG. 3B). Based on the motor controller 410 determining that the forward-reverse selector is not in the mode selection position, the motor controller does not modify the current operating mode of the tool and, rather, maintains the tool in the current operating mode (a first operating mode) at process block 906.

In response to the motor controller 410 determining that the forward-reverse selector 108 is in the mode selection position, the motor controller 410 listens for a voice command input signal at process block 908. In some examples, the motor controller 410 may constantly receive input from the microphone 702 (and/or microphone 806) are active, but only "listen" (i.e. process the received audio inputs to identify voice or other audio commands) for the voice command input signal upon a condition, such as the forward-reverse selector being in the mode selection position, as described above. In still further examples, the motor controller 410 may constantly listen for a voice command input signal at process block 908, regardless of any other inputs. For example, the motor controller 410 may monitor for inputs from the microphone 702. In other embodiments, the motor controller 410 may monitor for inputs from the wireless device 804 received via the communication interface 802. In one example, the motor controller 410 provides a signal to the wireless device 804 indicating the power tool is in a listening/receiving mode, which in turn instructs the wireless device 804 to listen for a voice command input signal.

At process block 910, the motor controller 410 determines whether the voice command input signal has been received. In some embodiments, where the voice command input signal is provided directly to the motor controller 410, such as via the microphone 702, the motor controller 410 determines whether the voice command signal has been received. In other embodiments, such as where the voice command signal has been received at the wireless device 804, the wireless device 804 may transmit a signal to the motor controller 410 indicating that a voice command input signal was received. In response to determining that no voice command input signal was received, the motor controller 410 continues to operate the tool in the current operating mode at process block 906.

In response to determining that a voice command input signal was received, it is determined whether the voice command input signal was a mode change/setting change instruction or an operation instruction at process block 912. In one embodiment, the motor controller 410 determines whether the received voice command input signal is a mode change instruction or an operation instruction. In other embodiments, where the voice command input signal is received at the wireless device 804, the wireless device 804 may determine whether the received voice command input signal is a mode change instruction or an operation instruction, and communicate the determination to the motor controller 410. Accordingly, one or both of the motor controller 410 and the wireless device 804 can process the received voice command input signal.

In one embodiment, processing a received voice command input signal is executed using one or more audio processing software routines or applications. For example, the processor 418 of the motor controller 410 may execute one or more audio processing routines stored in the memory 416. Alternatively or in combination, one or more processors or controllers of the wireless device 804 may process the received voice command input signal using one or more audio processing software routines or applications. In other embodiments, the motor controller 410 and/or the wireless device 804 utilize other mechanisms, such as look up tables, analog-to-digital converters, etc., to process the received voice command input signal, as applicable.

Examples of mode changes can include those described above, such as operating in different fastener modes (e.g., self-tapping screw, deck screw, concrete screw, drywall screw, etc.), speed modes (e.g., high, medium, low), torque modes (high, medium, low), and the like. Other mode changes may include switching between modes or profiles associated with different users.

Examples of operations can include: modifying one or more settings of the power tool 700; modifying one or more aspects of applications and/or profiles associated with the power tool 700; adjusting learning or adapting rates of the power tool 700; providing feedback to other devices such as a cloud based server or other data repository; providing commands to other devices (e.g. smartphone), and/or making audio notes. The audio notes may be stored either on the power tool 702 (e.g. in the memory 416), the wireless device 804, or transmitted to other devices, such as those described above. Providing feedback or other data to the other devices described above may be accomplished by providing the feedback from the power tool 700 to the wireless device 804 for further communication (i.e. to the other devices). For example, the power tool 700 may be used by more than one operator, and each operator may use the tool in different ways. Thus, one operator may be able to use a voice command to identify themselves. The power tool 700, via the motor controller 410 and/or the wireless device 804, may then load one or more set of parameters and/or settings that are associated with that user. In some embodiments, specific voice commands are used to initiate specific operations (e.g. "take a note," "provide feedback," "send a text message," make a call, etc.). Upon receiving the specific voice commands, the power tool 700 and/or the wireless device 804 then listens for subsequent voice input signals (e.g. the subject of the note and/or feedback) to complete the desired operation.

Other examples of operations may include: saving/recording/starring/labeling operations performed by the power tool 700; beginning or ending a saving of a use of the power tool 700; performing data synching to the wireless device 804 and/or other devices; such as those described above; activating or disabling a lock out function of the power tool; generating an alert to other users (e.g. crib managers, emergency responders, etc.); performing a factory reset; and/or preview to the power tool that a subsequent tool application may modify in some characteristic. In still further examples, operations may include activating, modifying, locking, deactivating, or providing other instructions to a secondary device, such as another power tool, or non-power tool devices.

The received voice commands for effectuating a mode change and/or an operation of the power tool 700 may be pre-defined voice commands that are associated with a given mode and/or operation. In other examples, the voice commands for specific modes and/or operations may be learned over time, or specifically taught by the user. For example, a user may be able to program one or more modes and/or operations to a specific voice command using the wireless device 804. For example, one or more applications on the wireless device 804 may be associated with the power tool 700, and allow a user to modify settings or program modes via a graphical user interface. The user may then use the applications to associated one or more voice commands with the modified settings or program modes, which are then used to allow the user access/execute/modify those settings or modes. However, in other examples, the user can program one or more modes and/or operations to a specific voice command using the power tool (e.g. via the microphone 702 and/or the user inputs 412). For example, the user may use voice commands to program one or more settings, modes or operations on the power tool 702. In other embodiments, the user may activate a learning mode via one or more of the user inputs 412 to program the one or more settings, modes or operations. In still further examples, the voice commands for effectuating the modes and/or operations may be a combination of pre-defined voice commands and user taught/learned voice commands.

Based on determining that the voice command input signal is a mode change instruction, the mode of the tool is modified at process block 914. Based on the voice command input signal being determined to be an operational instruction, the desired operation is performed at process block 916.

Figure 10:
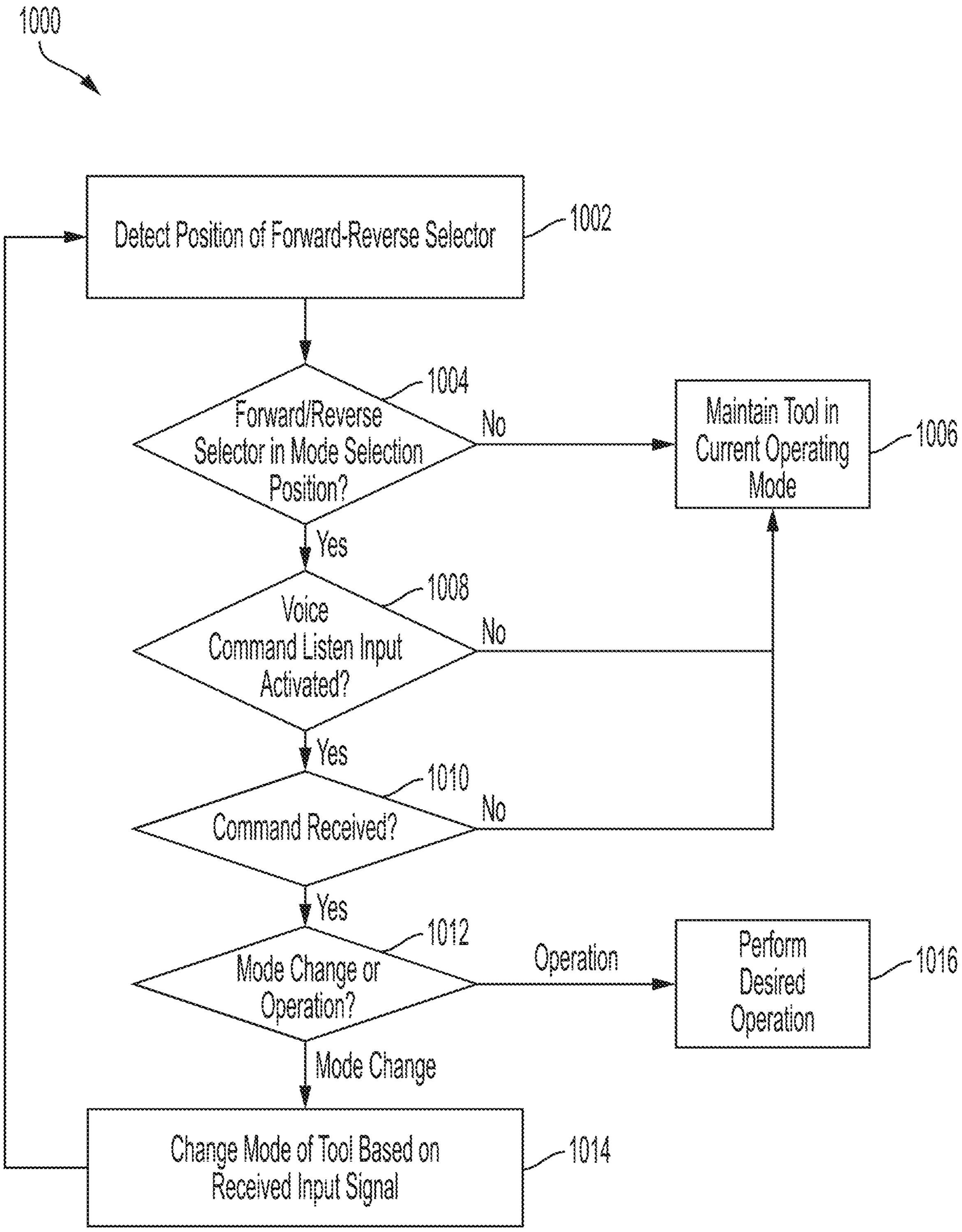
FIG. 10 is a flowchart illustrating a process for using voice commands, a forward-reverse selector, and a voice command listening activation input to control a power tool, according to some embodiments.

Turning now to FIG. 10, a process 1000 for using voice commands to control a power tool, such as power tool 700 is shown, according to some embodiment. The process 1000 is described as being performed by the power tool 700, as well as the associated block diagram of FIG. 8. However, the process 1000 may be executed by various other power tools, such as those described herein. In one example, the process 1000 is executed by a controller of a power tool, such as motor controller 410.

At process block 1002, the motor controller 410 detects a position of the forward-reverse selector 108. As described above, the forward-reverse selector 108 may have multiple positions. Specifically, the forward-reverse selector 108 may be a three position forward-reverse selector (forward-neutral-reverse), or a four position forward-reverse selector (forward-mode select-neutral-reverse). As described above, the forward-reverse selector 108 may be electrically coupled to the motor controller 410 and provide an input to the motor controller 410 indicating the position of the forward-reverse selector 108. For example, the forward-reverse selector 108 may include a voltage divider that provides a different voltage level as the input to the motor controller 410 depending on the position of the selector. Based on the input to the motor controller 410, a position of the forward-reverse selector 108 is determined.

At process block 1004, the motor controller 410 determines whether the forward-reverse selector 108 is in a mode selection position. In embodiments where the power tool 100 includes a three position forward-reverse selector, as described above, the mode selection position is the neutral position (see FIG. 3A). In embodiments where the power tool 100 includes a four position forward-reverse selector, the mode selection position is the mode selection, or fourth, position (see FIG. 3B). Based on the motor controller 410 determining that the forward-reverse selector is not in the mode selection position, the motor controller does not modify the current operating mode of the tool and, rather, maintains the power tool 700 in the current operating mode (a first operating mode) at process block 1006.

At process block 1008, it is determined whether a voice command listen input is activated. In one embodiment, the motor controller 410 determines whether a voice command listen input has been activated. For example, the motor controller 410 may use one or more audio processing software routines to analyze an audio input to determine if the received audio input corresponds to a known voice command listen input. However, in other embodiments, the wireless device 804 determines whether the voice command listen input has been activated. For example, the wireless device 804 may use one or more audio processing software routines to analyze an audio input to determine if the received audio input corresponds to a known voice command listen input. In one example, the voice command listen input is a specific voice command that is used to initiate a listening mode. Example specific voice commands could include a user saying "Hey Tool," "New Command" or some other applicable command to initiate the learning mode. In other example, the voice command listen input may be an input provided by one or more of the user inputs 412. For example, the mode selector 202 and/or the mode pad selector 122, as described above, may be used to initiate the listening mode. In other examples, an actuation of the trigger 110 when the forward-reverse selector 108 is in a mode selection position initiates the listening mode. In still other examples, the tool 700 may include one or more dedicated inputs that can actuated by a user to initiate the listening mode. The dedicated inputs may be a separate switch or other actuator that may be manipulated by a user to initiate the listening mode. In still further examples, actuation of the forward-reverse selector 108, such as in a predetermined combination described above, may initiate the listening mode.

At process block 1010, the motor controller 410 determines if the voice command input signal has been received. In some embodiments, where the voice command input signal is provided directly to the motor controller 410, such as via the microphone 702 and/or the wireless device 804, the motor controller 410 determines whether the voice command signal has been received. In other embodiments, such as where the voice command signal has been received at the wireless device 804, the wireless device 804 may transmit a signal to the motor controller 410 indicating that a voice command input signal was received. In still other embodiments, the microphone 702 may detect a voice signal, which is then transferred to an external device in whole or in part for processing on the wireless device 804. In some examples, the motor controller 410 may partially process the voice signal prior to transmitting the voice signal to the wireless device 804 for final processing. In response to determining that no voice command input signal was received, the motor controller 410 continues to operate the tool in the current operating mode at process block 1006.

In response to determining that a voice command input signal was received, it is determined whether voice command input signal was a mode/settings change instruction and/or an operation instruction at process block 1012. Mode change instructions and operation instructions may be similar to those described above. In one embodiment, the motor controller 410 determines whether the received voice command input signal is a mode change instruction or an operation instruction. In other embodiments, where the voice command input signal is received at the wireless device 804, the wireless device 804 may determine whether the received voice command input signal is a mode change instruction or an operation instruction, and communicate the determination to the motor controller 410. The determination by the motor controller 410 or the wireless device 804 may be performed using similar techniques as described above with regards to block 912 of FIG. 9.

Based on determining that the voice command input signal is a mode change instruction, the mode of the tool is modified at process block 1014. Based on the voice command input signal being determined to be an operational instruction, the desired operation is performed at process block 1016.

Figure 11:
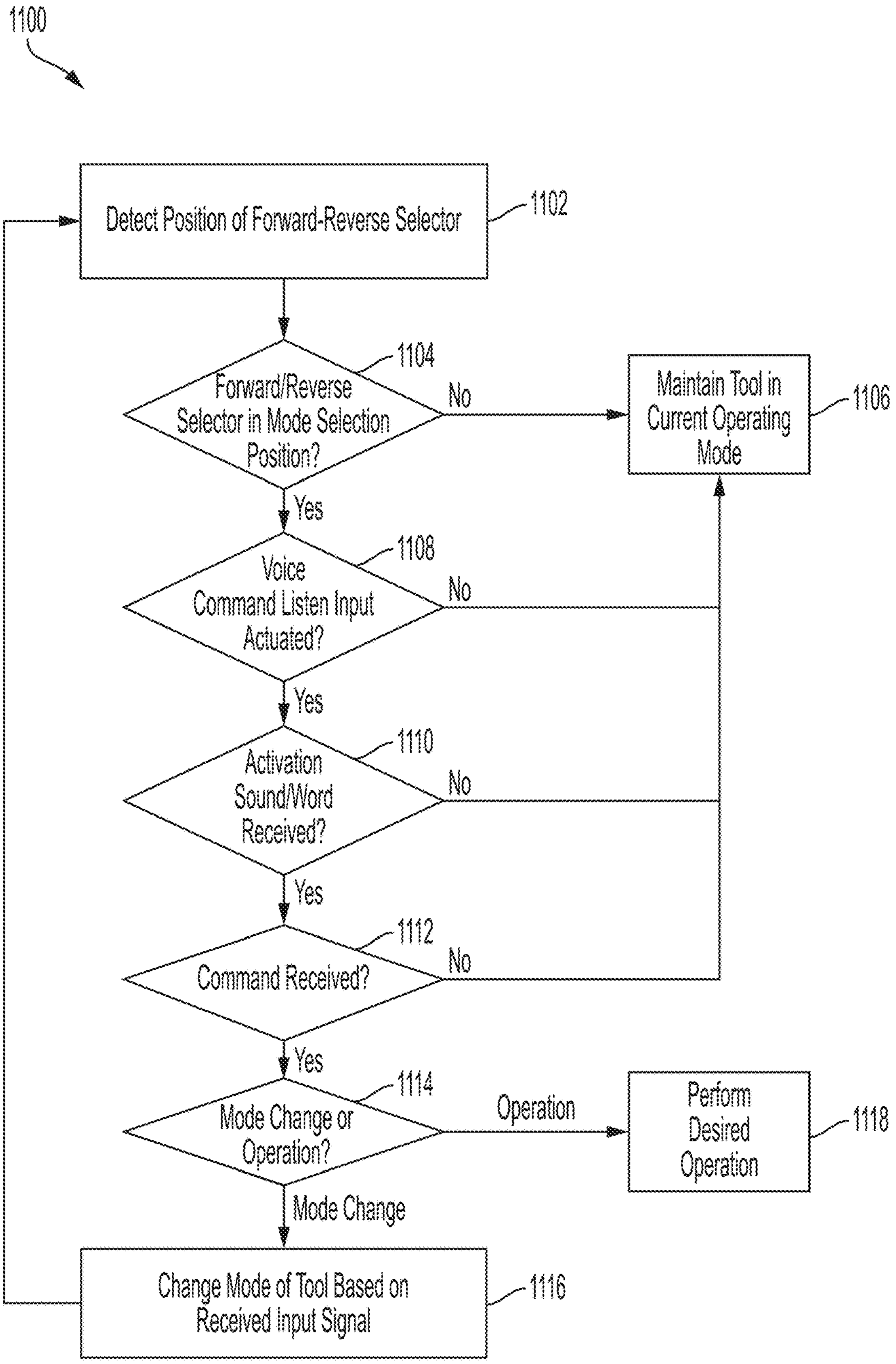
FIG. 11 is a flowchart illustrating a process for using voice commands, a forward-reverse selector, a voice command listening activation input, and/or an activation sound/word to control a power tool, according to some embodiments.

Turning now to FIG. 11, a process for 1100 for using voice commands to control a power tool, such as power tool 700, is shown, according to some embodiment. The process 1100 is described as being performed by the power tool 700, as well as the associated block diagram of FIG. 8. However, the process 1100 may be executed by various other power tools, such as those described herein. In one example, the process 1100 is executed by a controller of a power tool 700, such as motor controller 410.

At process block 1102, the motor controller 410 detects a position of the forward-reverse selector 108. As described above, the forward-reverse selector 108 may have multiple positions. Specifically, the forward-reverse selector 108 may be a three position forward-reverse selector (forward-neutral-reverse), or a four position forward-reverse selector (forward-mode select-neutral-reverse). As described above, the forward-reverse selector 108 may be electrically coupled to the motor controller 410 and provide an input to the motor controller 410 indicating the position of the forward-reverse selector 108. For example, the forward-reverse selector 108 may include a voltage divider that provides a different voltage level as the input to the motor controller 410 depending on the position of the selector. Based on the input to the motor controller 410, a position of the forward-reverse selector 108 is determined.

At process block 1004, the motor controller 410 determines whether the forward-reverse selector 108 is in a mode selection position. In embodiments where the power tool 100 includes a three position forward-reverse selector, as described above, the mode selection position is the neutral position (see FIG. 3A). In embodiments where the power tool 100 includes a four position forward-reverse selector, the mode selection position is the mode selection, or fourth, position (see FIG. 3B). Based on the motor controller 410 determining that the forward-reverse selector is not in the mode selection position, the motor controller does not modify the current operating mode of the tool and, rather, maintains the tool in the current operating mode (a first operating mode) at process block 1006.

At process block 1108, it is determined whether a voice command listen input is activated. In one embodiment, the motor controller 410 determines whether a voice command listen input has been activated. However, in other embodiments, the wireless device 804 determines whether the voice command listen input has been activated. In one example, the voice command listen input may be an input provide by one or more of the user inputs 412. For example, the mode selector 202 and/or the mode pad selector 122, as described above, may be used to initiate the listening mode. In other examples, an actuation of the trigger 110 when the forward-reverse selector 108 is in a mode selection position initiates the listening mode. In still other examples, the tool 700 may include one or more dedicated inputs that can actuated by a user to initiate the listening mode. In further examples, the tool 700 constantly listens for a voice command input.

At process block 1110, it is determined whether an activation sound/word has been received. In one example, the activation sound/word is a specific voice command that is used to indicate that a voice command to perform an operation or modify a mode of the power tool 700 is going to be provided. Example specific activation sounds/words could include a user saying "Hey Tool," "New Command" or some other applicable sound, word, or combination to initiate the listening mode. In some embodiments, the motor controller 410 monitors for the receipt of the activation sound/word. In other embodiments, the wireless device 804 monitors for the receipt of the activation sound/word. In still further embodiments, both the wireless device 804 and motor controller 410 monitor for the receipt of the activation sound/word. Based on the activation sound/word not being received at process block 1110, the current operating mode of the power tool 700 is maintained at process block 1106.

At process block 1112, the motor controller 410 determines whether a voice command input signal has been received. In some embodiments, where the voice command input signal is provided directly to the motor controller 410, such as via the microphone 702 and/or the wireless device 804, the motor controller 410 determines whether the voice command signal has been received. In other embodiments, such as where the voice command signal has been received at the wireless device 804, the wireless device 804 may transmit a signal to the motor controller 410 indicating that a voice command input signal was received. In response to determining that no voice command input signal was received, the motor controller 410 continues to operate the tool in the current operating mode at process block 1106.

In response to determining that a voice command input signal was received, it is determined whether voice command input signal was a mode change instruction or an operation instruction at process block 1114. Mode change instructions and operation instructions may be similar to those described above. In one embodiment, the motor controller 410 determines whether the received voice command input signal is a mode change instruction or an operation instruction. In other embodiments, where the voice command input signal is received at the wireless device 804, the wireless device 804 may determine whether the received voice command input signal is a mode change instruction or an operation instruction, and communicate the determination to the motor controller 410. The determination by the motor controller 410 or the wireless device 804 may be performed using similar techniques as described above with regards to block 912 of FIG. 9.

Based on determining that the voice command input signal is a mode change instruction, the mode of the tool is modified at process block 1116. Based on the voice command input signal being determined to be an operational instruction, the desired operation is performed at process block 1118.

In some embodiments, a tool, such as those described herein, may be configured to alert a user if a mode of the tool was modified, and require a user to confirm that the mode is to be modified. In further examples, the tool may alert a user when a mode was not able to be modified (e.g. unintelligible voice inputs). Alerts could include buzzers, speakers, lights, motor FET control patterns, phone/web notifications, etc.

Various features and advantages are set forth in the following claims.

What is claimed is:

1. A power tool, comprising:

a forward-reverse selector;

a motor; and a motor controller including an electronic processor and a memory, the motor controller coupled to the forward-reverse selector, and configured to:

operate the power tool in a first operating mode, determine whether a position of the forward-reverse selector is in a mode selection position separate from a forward position and a reverse position of the forward-reverse selector, receive a mode selection input, and configure the power tool to operate in an operating mode based on the mode selection input in response to determining the position of the forward-reverse selector is in the mode selection position.

2. The power tool of claim 1, wherein the power tool further includes a microphone.

3. The power tool of claim 2, wherein the mode selection input is an audible input received by the microphone.

4. The power tool of claim 3, wherein the audible input is a voice command.

5. The power tool of claim 1, wherein the motor controller is further configured to:

receive a first signal from the mode selection input in response to a first actuation of the mode selection input;

receive a second signal from the mode selection input in response to a second actuation of the mode selection input; and configure the power tool to operate in a second operating mode in response to receiving the first signal and the second signal.

6. The power tool of claim 5, wherein the power tool is configured to operate in the second operating mode in response to determining that the first signal and the second signal were received within a predetermined amount of time.

7. The power tool of claim 5, wherein the mode selection input is a trigger of the power tool.

8. The power tool of claim 1, wherein the motor controller is further configured to:

receive a first signal from the mode selection input indicating an actuation of a trigger of the power tool;

determine whether the signal exceeds a predetermined duration;

configure the power tool to operate in a second operating mode in response to determining that the first signal exceeds the predetermined duration.

9. The power tool of claim 8, wherein the second operating mode is a lock-out mode.

10. A method for controlling an operating mode of a power tool, the method comprising:

operating, by a motor controller, a motor of the power tool in a first operating mode;

determining whether a position of a forward-reverse selector of the power tool is in a mode selection position separate from a forward position and a reverse position of the forward-reverse selector;

receiving a mode selection input at the motor controller; and configuring, by the motor controller, the power tool to operate in an operating mode based on the mode selection input in response to determining the position of the forward-reverse selector is in the mode selection position.

11. The method of claim 10, further comprising:

receiving, at the motor controller, a first signal from the mode selection input in response to a first actuation of the mode selection input;

receiving, at the motor controller, a second signal from the mode selection input in response to a second actuation of the mode selection input; and configuring, by the motor controller, the power tool to operate in the second operating mode in response to receiving the first signal and the second signal.

12. The method of claim 11, wherein the power tool is configured to operate in the second operating mode in response to determining that the first signal and the second signal were received within a predetermined amount of time.

13. The method of claim 11, wherein the mode selection input is a trigger of the power tool.

14. The method of claim 10, further comprising:

receiving a first signal from the mode selection input indicating an actuation of a trigger of the power tool;

determining whether the signal exceeds a predetermined threshold;

configuring the power tool to operate in a second operating mode in response to determining that the first signal exceeds the predetermined threshold.

15. The method of claim 14, wherein the second operating mode is a lock-out mode.

16. A power tool, comprising:

a forward-reverse selector;

a motor; and a motor controller including an electronic processor and a memory, the motor controller coupled to the forward-reverse selector, and configured to:

operate the power tool in a first operating mode, determine whether a position of the forward-reverse selector is in a mode selection position separate from a forward position and a reverse position of the forward-reverse selector, receive a first signal from a mode selection input in response to a first actuation of the mode selection input, receive a second signal from the mode selection input in response to a second actuation of the mode selection input; and configure the power tool to operate in the second operating mode in response to receiving the first signal and the second signal.

17. The power tool of claim 16, wherein the power tool is configured to operate in the second operating mode in response to determining that the first signal and the second signal were received within a predetermined amount of time.

18. The power tool of claim 16, wherein the mode selection input is a trigger of the power tool.

19. The power tool of claim 16, wherein the first signal and the second are each generated by respective actuations of the mode selection input.

20. The power tool of claim 16, wherein the forward-reverse selector is selectable between the forward position, the mode selection position, a neutral position, and the reverse position.

* * * * *